United States Patent
Fernald et al.

(10) Patent No.: US 7,400,985 B2
(45) Date of Patent: Jul. 15, 2008

(54) APPARATUS HAVING AN ARRAY OF CLAMP ON PIEZOELECTRIC FILM SENSORS FOR MEASURING PARAMETERS OF A PROCESS FLOW WITHIN A PIPE

(75) Inventors: Mark R. Fernald, Enfield, CT (US); Michael A. Davis, Glastonbury, CT (US); Alan D. Kersey, South Glastonbury, CT (US); Timothy J. Bailey, Longmeadow, MA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/712,818

(22) Filed: Nov. 12, 2003

(65) Prior Publication Data

US 2004/0168522 A1   Sep. 2, 2004

Related U.S. Application Data

(60) Provisional application No. 60/426,724, filed on Nov. 15, 2002, provisional application No. 60/425,436, filed on Nov. 12, 2002.

(51) Int. Cl.
*G06F 19/00* (2006.01)
(52) U.S. Cl. .......................................... 702/48; 702/45
(58) Field of Classification Search ................ 73/19.01, 73/19.05, 861, 861.18, 861.23, 861.27, 61.45, 73/61.47, 61.49, 61.53, 227, 570, 645, 861.42, 73/1.15; 702/25, 33, 50, 54, 127, 138, 140, 702/142, 47, 48, 52, 45; 257/254
See application file for complete search history.

(56) References Cited

U.S. PATENT DOCUMENTS

| | | | |
|---|---|---|---|
| 3,149,492 A | 9/1964 | Weinberg | ................. 73/724 |
| 4,048,853 A | 9/1977 | Smith et al. | ............... 73/861.25 |
| 4,080,837 A | 3/1978 | Alexander et al. | ......... 73/61.45 |
| 4,090,404 A | 5/1978 | Ligier et al. | |

(Continued)

FOREIGN PATENT DOCUMENTS

FR   2725787   4/1996

(Continued)

OTHER PUBLICATIONS

U.S. Appl. No. 60/425,436, filed Nov. 12, 2002.

(Continued)

*Primary Examiner*—John E. Barlow, Jr.
*Assistant Examiner*—Douglas N Washburn

(57) ABSTRACT

A apparatus 10,110,170 is provided that measures the speed of sound and/or vortical disturbances propagating in a single phase fluid flow and/or multiphase mixture to determine parameters, such as mixture quality, particle size, vapor/mass ratio, liquid/vapor ratio, mass flow rate, enthalpy and volumetric flow rate of the flow in a pipe, by measuring acoustic and/or dynamic pressures. The apparatus includes a spatial array of unsteady pressure sensors 15-18 placed at predetermined axial locations $x_1$-$x_N$ disposed axially along the pipe 14. The pressure sensors 15-18 provide acoustic pressure signals $P_1(t)$-$P_N(t)$ to a signal processing unit 30 which determines the speed of sound $a_{mix}$ propagating through of the process flow 12 flowing in the pipe 14. The pressure sensors are piezoelectric film sensors that are clamped onto the outer surface of the pipe at the respective axial location.

49 Claims, 16 Drawing Sheets
(1 of 16 Drawing Sheet(s) Filed in Color)

U.S. PATENT DOCUMENTS

| | | | |
|---|---|---|---|
| 4,144,768 A | 3/1979 | Andersson et al. | 73/646 |
| 4,153,747 A | 5/1979 | Young et al. | 428/41.5 |
| 4,191,334 A | 3/1980 | Bulanda et al. | 24/16 PB |
| 4,216,403 A * | 8/1980 | Krempl et al. | 310/328 |
| 4,248,085 A | 2/1981 | Coulthard | 73/861.06 |
| 4,304,126 A * | 12/1981 | Yelke | 73/119 A |
| 4,361,937 A | 12/1982 | Davis | 24/68 PP |
| 4,376,302 A | 3/1983 | Miller et al. | |
| 4,445,389 A | 5/1984 | Potzick et al. | 73/861.27 |
| 4,454,767 A | 6/1984 | Shinkai et al. | 73/861.18 |
| 4,568,851 A | 2/1986 | Soni et al. | 310/330 |
| 4,638,207 A | 1/1987 | Radice et al. | |
| 4,706,501 A | 11/1987 | Atkinson et al. | 73/730 |
| 4,794,295 A | 12/1988 | Penneck et al. | |
| 4,849,946 A | 7/1989 | Beauducel | 367/155 |
| 4,883,271 A * | 11/1989 | French | 273/454 |
| 4,896,540 A | 1/1990 | Shakkottai et al. | 73/861.02 |
| 5,031,460 A | 7/1991 | Kanenobu et al. | 73/730 |
| 5,040,415 A | 8/1991 | Barkhoudarian | 73/861.03 |
| 5,083,452 A | 1/1992 | Hope | 73/61 R |
| 5,131,278 A | 7/1992 | Baumoel | |
| 5,168,673 A * | 12/1992 | Nemir et al. | 52/1 |
| 5,218,197 A | 6/1993 | Carroll | 250/227.19 |
| 5,285,675 A | 2/1994 | Colgate et al. | 73/23.2 |
| 5,357,486 A | 10/1994 | Pearce | 367/159 |
| 5,367,911 A | 11/1994 | Jewell et al. | 73/861.08 |
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,550,791 A | 8/1996 | Peloquin | |
| 5,591,922 A | 1/1997 | Segeral et al. | 73/861.04 |
| 5,670,720 A | 9/1997 | Clark et al. | 73/730 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,016,702 A | 1/2000 | Maron | 73/705 |
| 6,135,209 A | 10/2000 | Uhlenkott | 166/369 |
| 6,148,672 A | 11/2000 | Cawley et al. | 73/622 |
| 6,151,958 A | 11/2000 | Letton et al. | 73/61.79 |
| 6,202,494 B1 | 3/2001 | Riebel et al. | 73/861.29 |
| 6,271,621 B1 | 8/2001 | Ito et al. | 310/358 |
| 6,349,599 B1 | 2/2002 | Lynnworth et al. | 73/644 |
| 6,354,147 B1 * | 3/2002 | Gysling et al. | 73/61.79 |
| 6,378,357 B1 | 4/2002 | Han et al. | 73/54.41 |
| 6,397,683 B1 | 6/2002 | Hagenmeyer et al. | 73/861.18 |
| 6,435,030 B1 | 8/2002 | Gysling et al. | 73/587 |
| 6,443,226 B1 | 9/2002 | Diener et al. | 166/241.6 |
| 6,450,037 B1 | 9/2002 | McGuinn et al. | 73/705 |
| 6,463,813 B1 | 10/2002 | Gysling | 73/862.59 |
| 6,526,834 B1 | 3/2003 | Kohler et al. | 73/777 |
| 6,536,291 B1 * | 3/2003 | Gysling et al. | 73/861.42 |
| 6,550,342 B2 | 4/2003 | Croteau et al. | 73/800 |
| 6,558,036 B2 | 5/2003 | Gysling et al. | 374/147 |
| 6,587,798 B2 | 7/2003 | Kersey et al. | 702/50 |
| 6,601,458 B1 | 8/2003 | Gysling et al. | 73/861.04 |
| 6,609,069 B2 | 8/2003 | Gysling | 702/48 |
| 6,644,130 B2 | 11/2003 | Imai et al. | 73/861.27 |
| 6,668,664 B1 | 12/2003 | Ohkawa | 73/861.27 |
| 6,691,584 B2 * | 2/2004 | Gysling et al. | 73/861.42 |
| 6,698,297 B2 | 3/2004 | Gysling | 73/861.63 |
| 6,732,575 B2 | 5/2004 | Gysling et al. | 73/61.79 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 6,862,920 B2 | 3/2005 | Gysling et al. | 73/61.79 |
| 6,868,737 B2 | 3/2005 | Croteau et al. | 73/800 |
| 6,889,562 B2 | 5/2005 | Gysling et al. | 73/861.42 |
| 6,898,541 B2 | 5/2005 | Gysling et al. | 702/100 |
| 6,945,095 B2 | 9/2005 | Johansen | |
| 7,000,485 B2 | 2/2006 | Ao et al. | 73/861.29 |
| 2002/0123852 A1 | 9/2002 | Gysling et al. | |
| 2002/0129662 A1 * | 9/2002 | Gysling et al. | 73/861.42 |
| 2003/0010126 A1 * | 1/2003 | Romanet et al. | 73/649 |
| 2003/0038231 A1 | 2/2003 | Davis et al. | |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2004/0016284 A1 | 1/2004 | Gysling et al. | |
| 2004/0069069 A1 * | 4/2004 | Gysling et al. | 73/736 |
| 2004/0074312 A1 | 4/2004 | Gysling | |
| 2004/0144182 A1 * | 7/2004 | Gysling et al. | 73/861.42 |
| 2004/0167735 A1 | 8/2004 | Rothman et al. | 702/100 |
| 2004/0168522 A1 * | 9/2004 | Fernald et al. | 73/861.01 |
| 2004/0168523 A1 | 9/2004 | Bailey et al. | |
| 2004/0210404 A1 * | 10/2004 | Gysling et al. | 702/50 |
| 2004/0226386 A1 * | 11/2004 | Gysling et al. | 73/861.42 |
| 2004/0231431 A1 * | 11/2004 | Sullivan et al. | 73/861.42 |
| 2004/0255695 A1 * | 12/2004 | Gysling et al. | 73/862 |
| 2005/0005713 A1 * | 1/2005 | Winston et al. | 73/861.42 |
| 2005/0011283 A1 * | 1/2005 | Gysling et al. | 73/861.44 |
| 2005/0011284 A1 * | 1/2005 | Gysling et al. | 73/861.44 |

FOREIGN PATENT DOCUMENTS

| | | |
|---|---|---|
| GB | 2282931 | 4/1995 |
| WO | WO 9314382 | 7/1993 |
| WO | WO 99/67629 | 12/1999 |
| WO | WO 0060317 | 10/2000 |
| WO | WO 0102810 | 1/2001 |
| WO | WO 03062759 | 7/2003 |

OTHER PUBLICATIONS

U.S. Appl. No. 60/426,724, filed Nov. 15, 2002.

"Mass Fraction Measurements in Multiphase Flow using a Clamp on PVDF Array", Johan Carlson, Oct. 2000.

"PVDF and Array Transducers", Robert A. Day, NDTnet—Sep. 1996, vol. 1, No. 9.

"Polymer Piezoelectric Transducers for Ultrasonic NDE", Authors: Yhoseph Bar-Chohen, Tianji Xue And Shyh-Shiuh Lih, NDTnet—Sep. 1996, vol. 1, No. 9.

"Piezofilm Sensors Technical Manual"—Measurement Specialities, Inc. P/N 1005663-1—Rev. B Apr. 2, 2009.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Sonar-Based Volumetric Flow Meter for Pulp and Paper Applications" by: Daniel L. Gysling and Douglas H. Loose—Dec. 3, 2002.

Sonar-Based Volumetric Flow Meter for Chemical and Petrochemical Applications by: Daniel L. Gysling and Douglas H. Loose—Feb. 14, 2003.

* cited by examiner

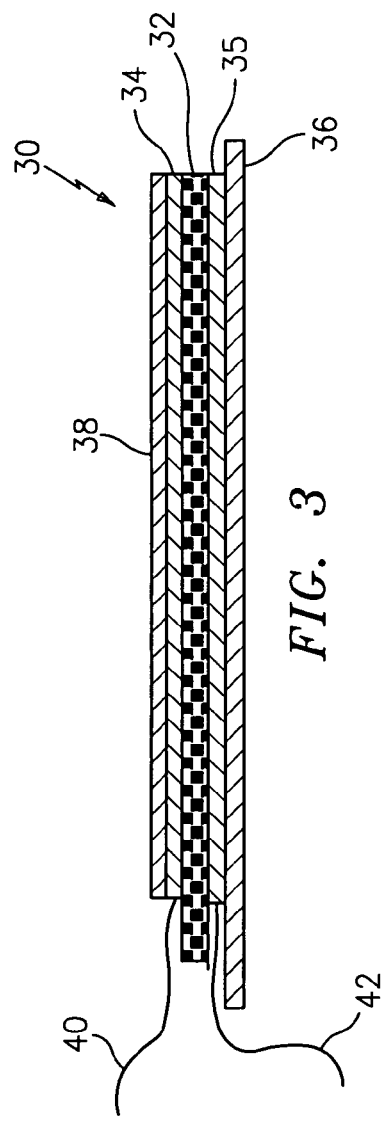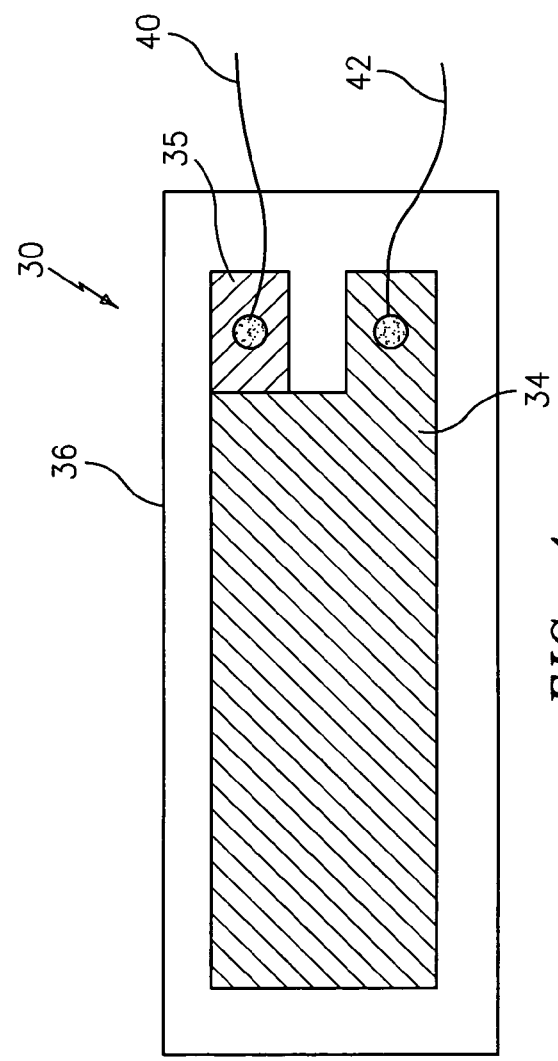

APPARATUS HAVING AN ARRAY OF CLAMP ON PIEZOELECTRIC FILM SENSORS FOR MEASURING PARAMETERS OF A PROCESS FLOW WITHIN A PIPE

CROSS-REFERENCE TO RELATED PATENT APPLICATIONS

This application claims the benefit of U.S. Provisional Application No. 60/425,436, filed Nov. 12, 2002; and U.S. Provisional Application No. 60/426,724, filed Nov. 15, 2002, all of which are incorporated herein by reference in their entirety.

TECHNICAL FIELD

This invention relates to an apparatus for measuring the parameters of a single phase and/or multiphase flow, and more particularly to an apparatus having an array of piezoelectric film sensors clamped onto a process flow pipe for measuring the speed of sound and/or vortical disturbances propagating in a single phase and/or multiphase flow to determine parameters, such as mixture quality, particle size, vapor/mass ratio, liquid/vapor ratio, mass flow rate, enthalpy and volumetric flow rate of the flow in the pipe, for example, by measuring acoustic and/or dynamic pressures.

BACKGROUND ART

Numerous technologies have been implemented to measure volumetric and mass flow rates of fluids in industrial processes. Some of the more common approaches are based upon ultrasonic time of flight and/or Doppler effects, Coriolis effects, rotating wheels, electromagnetic induction, and pressure differentials. Each of these techniques has certain drawbacks. For example, invasive techniques that rely on insertion of a probe into the flow, or geometry changes in the pipe, may be disruptive to the process and prone to clogging. Other methods such as ultrasonics may be susceptible to air or stratified flow. Meters that use rotating wheels or moving parts are subject to reliability issues. Coriolis meters are limited when pipe diameters become large due to the increase in force required to vibrate the pipe.

One such process fluid is a saturated vapor/liquid fluid mixture (e.g., steam). It would be advantageous to be able to measure the vapor quality of this fluid mixture. Vapor quality of a saturated vapor/liquid mixture is defined as ratio of the mass of the vapor phase to the total mass of the mixture. Saturated mixtures exist at temperatures and pressures at which liquid and vapor phases coexist. The temperatures and pressures at which the liquid and vapor phases coexist lie under the "vapor bubble" on a phase diagram. The collection of points known as the saturated liquid line and the collections of points known as the saturated vapor line define the vapor bubble. These two lines connect at, what is termed, the critical point. Saturated mixtures exist only under the vapor bubble. For pressures and temperatures outside of the vapor bubble, the fluid exists as a single phase and the properties of that fluid, such as density, enthalpy, internal energy, etc., are uniquely defined by the pressure and temperature. For common fluids, such as water, these properties are tabulated as functions of pressure and temperatures and are available through a variety of references including a website hosted by NIST (ref: http://webbook.nist.gov/chemistry/fluid/).

For fluids at pressures and temperatures that lie within the vapor bubble, the fluids represent mixtures of the liquid and vapor phase. Although the properties of both the vapor and liquid phases are well defined (and tabulated for known substances), the properties of the mixture are no longer uniquely defined as functions of pressure and temperature. In order to define the averaged properties of a saturated mixture, the ratio of the vapor and liquid components of the mixture must be defined. The quality of the mixture, in addition to the pressure and temperature, must be defined to uniquely determine the properties of the mixture.

Measuring the average properties of a single or multi-phase process flow is important in many industrial application since it is the mass averaged properties of the working fluid that enter directly into monitoring the thermodynamic performance of many processes. For example, it is the difference in the flux of enthalpy of the steam mixture flowing into and exiting from a turbine that determines the maximum mechanical work that can be extracted from the working fluid, and thus is critical to determining component efficiency. However, if the steam entering or exiting the turbine were saturated, pressure and temperature measurement would not sufficient to determine the specific enthalpy, but rather, a measure of the quality of the steam would be required to uniquely define the thermodynamic properties of the saturated steam mixture.

Note that once the quality and pressure (or temperature) of a saturated mixture is defined, the thermodynamic properties of the mixture are defined through mixing laws provided the properties of the liquid and vapor sates are known. For example, measuring speed of sound enables one to determine quality, which in turn enables one to calculate enthalpy, density, and other properties of the mixture. In addition to measuring the specific enthalpy, a measurement of the total mass is also, in general, required to determine the flux of enthalpy.

There are many other situations where knowing the quality of a saturated mixture is beneficial. For example, in a steam power plant, the quality of the steam within the steam turbine affects blade life. Generally it is desired to operate so the quality is as high as possible throughout the turbine to minimize liquid water drops that will erode the metal blades. Knowing the quality at the turbine inlet and exhaust (or at the exhaust only if the inlet is super-heated) provides a means to monitor the quality throughout the turbine. Also, to monitor plant performance so that it can be operated at optimum conditions and to identify degradation effects, the steam turbine thermal performance must be known. This requires the fluid enthalpy at the inlet and exhaust of each turbine to be known. If the fluid at either or both locations is saturated, pressure and temperature measurements alone will not be enough to determine the enthalpy. However if an additional measurement of quality is made the enthalpy is then defined. In addition, there may be other applications in refrigeration cycles.

The ability to measure the flow rate and composition of the saturated vapor/liquid mixtures within the conduits is an important aspect of any system or strategy design to optimize the performance of a system based on saturated vapor/liquid mixtures. The industry recognizes this, and has been developing a wide variety of technologies to perform this measurement. These include probe based devices, sampling devices, venturis and ultrasonic devices This invention provides an apparatus and method to measure homogeneous and/or non-homogeneous fluids used in industrial systems having various working fluids to determine various parameters of the process fluid, such as the volumetric flow of the fluid, the consistency or composition of the fluid, the density of the fluid, the Mach number of the fluid, the size of particle flowing through the fluid, the air/mass ratio of the fluid and/or the percentage of entrained air/gas within a liquid or slurry.

Here a novel approach to flow measurements is proposed which utilizes a non-intrusive, externally mounted sensing element that requires no moving parts and is highly reliable. This approach is based upon signal correlation and/or array processing techniques of unsteady pressure measurements induced in an array of externally mounted sensors. The piezo-film sensors clamped onto the outer surface of a pipe provides circumferential averaging of the unsteady pressures within the pipe and provide an inexpensive solution to accurately measuring the unsteady pressures. The piezo-film also have the advantage of being able to wrap around a substantial portion of the outer circumference of the pipe to provide circumferential averaging of the unsteady pressures with the pipe.

SUMMARY OF THE INVENTION

Objects of the present invention include an apparatus having an array of piezoelectric film sensors clamped axially spaced to the outer surface of the pipe for measuring the unsteady pressures of a single and multi-phase process flows within a pipe to determine at least one parameter of the process flow.

According to the present invention, an apparatus for measuring at least one parameter of a process flow flowing within a pipe. The apparatus includes at least two pressure sensors clamped onto the outer surface of the pipe at different axial locations along the pipe. Each of the pressure sensors provides a respective pressure signal indicative of a pressure disturbance within the pipe at a corresponding axial position. Each of the pressure sensors includes a strap and a piezoelectric film sensor attached to the strap. A signal processor, responsive to said pressure signals, provides a signal indicative of at least one parameter of the process flow flowing within the pipe.

The foregoing and other objects, features and advantages of the present invention will become more apparent in light of the following detailed description of exemplary embodiments thereof.

BRIEF DESCRIPTION OF THE DRAWINGS

The file of this patent contains at least one drawing(s)/photograph(s) executed in color. Copies of this patent with color drawing(s)/photograph(s) will be provided by the Office upon request and payment of the necessary fee.

FIG. 3 is a cross-sectional view of a piezoelectric film sensor in accordance with the present invention.

FIG. 4 is a top plan view of a piezoelectric film sensor in accordance with the present invention.

BEST MODE FOR CARRYING OUT THE INVENTION

Figure 1A:
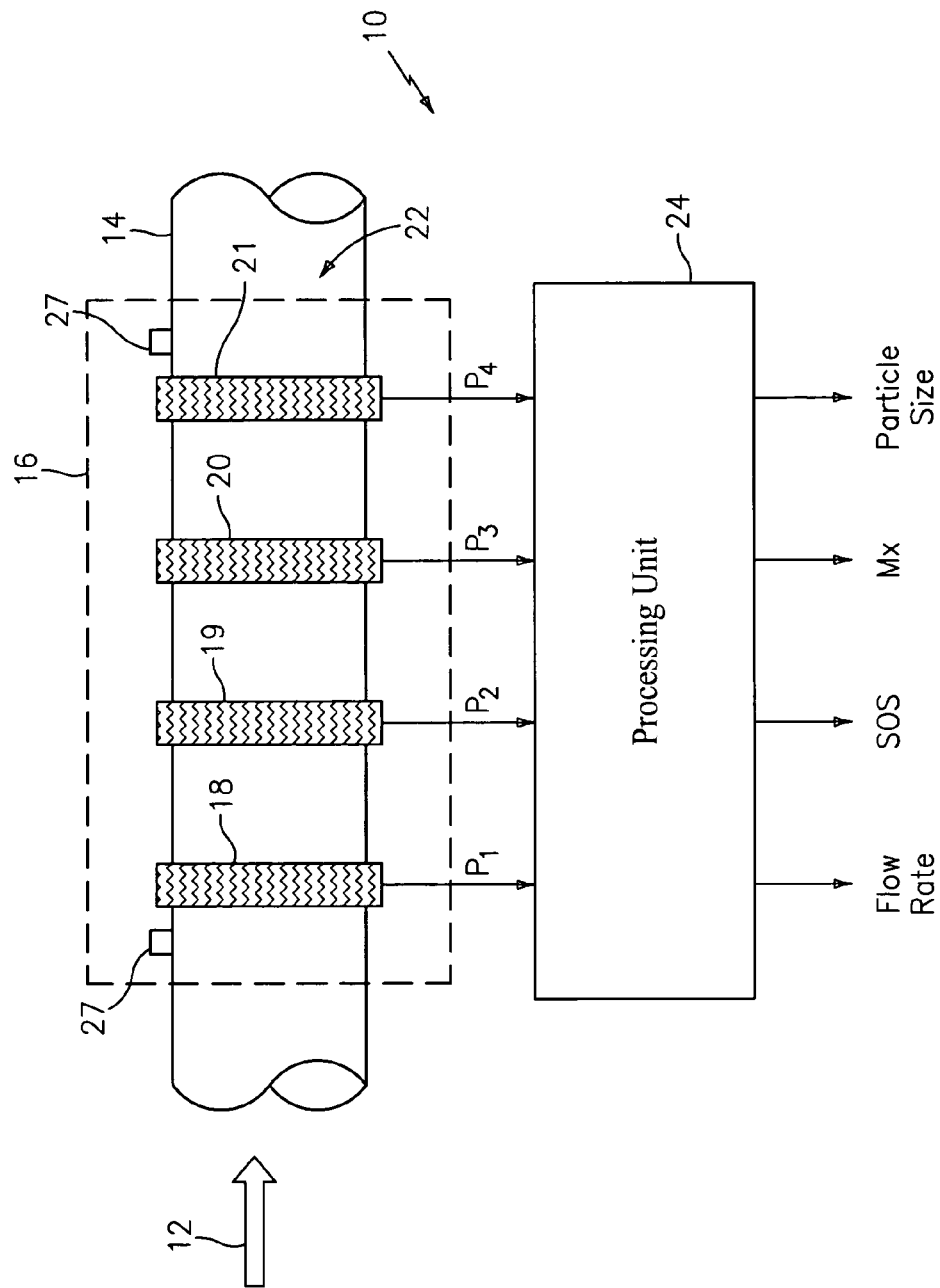
FIG. 1 is a schematic illustration of an apparatus having an array of piezoelectric film sensors clamped onto a pipe, in accordance with the present invention.
Figure 1B:
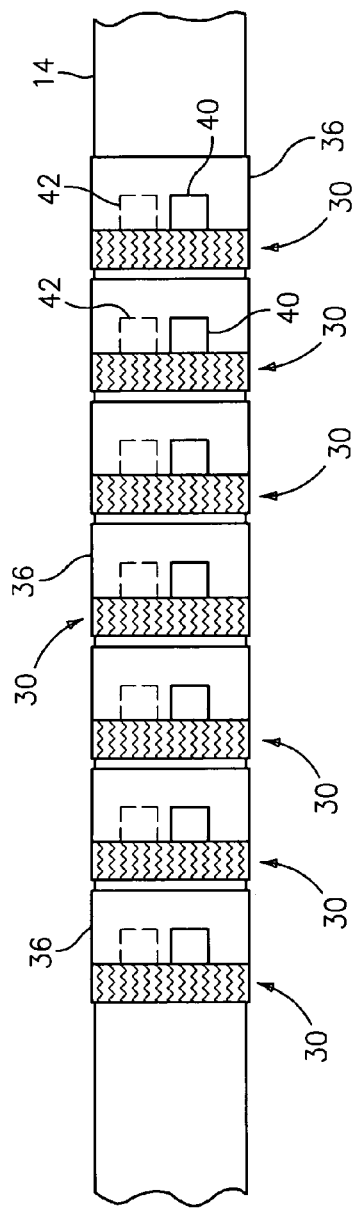

Referring to FIG. 1, an apparatus, generally shown as 10, is provided to sense and determine specific characteristics or parameters of a single phase fluid 12 (e.g., gas and liquid) and/or a multi-phase mixture 12 (e.g., process flow) flowing through a pipe. The multi-phase mixture may be a two-phase liquid/vapor mixture, a solid/vapor mixture or a solid/liquid mixture, gas entrained liquid or even a three-phase mixture. As will be described in greater detail, the apparatus measures the speed of sound propagating through the fluid or multiphase mixture flow to determine any one of a plurality of parameters of the flow, such as the steam quality or "wetness", vapor/mass ratio, liquid/solid ratio, the volumetric flow rate, the mass flow rate, the size of the suspended particles, density, gas volume fraction, and the enthalpy of the flow. Additionally, the apparatus 10 is capable of measuring the unsteady pressure disturbances (e.g., vortical effects, density changes) of the flow passing through the pipe to determine the velocity of the flow, and hence the volumetric flow rate of the flow.

FIG. 1 illustrates a schematic drawing of the apparatus 10 that includes a sensing device 16 comprising an array of pressure sensors (or transducers) 18-21 spaced axially along the outer surface 22 of a pipe 14, having a process flow propagating therein. The pressure sensors measure the unsteady pressures produced by acoustical and/or vortical disturbances within the pipe, which are indicative of a parameter of the single phase fluid or multiphase mixture 12. The output signals ($P_1$-$P_4$) of the pressure sensors 18-21 are provided to a processing unit 24, which processes the pressure measurement data and determines at least one parameter of the flow. Such as, the characteristics and parameters determined may include the volumetric flow of the flow, the consistency or composition of the flow, the density of the mixture, the Mach number of the flow, the size of particle flowing through the mixture, the air/mass ratio of the mixture and/or the percentage of entrained air or gas within the mixture.

In an embodiment of the present invention shown in FIG. 1, the apparatus 10 has four pressure sensors 18-21 disposed axially along the pipe 14 for measuring the unsteady pressure $P_1$-$P_4$ of the fluid or mixture 12 flowing therethrough. The apparatus 10 has the ability to measure the volumetric flow rate and other flow parameters using one or both of the following techniques described herein below:

1) Determining the speed of sound of acoustical disturbances or sound waves propagating through the flow 12 using the array of pressure sensors 18-21, and/or
2) Determining the velocity of vortical disturbances or "eddies" propagating through the flow 12 using the array of pressure sensors 18-21.

Generally, the first technique measures unsteady pressures created by acoustical disturbances propagating through the flow 12 to determine the speed of sound (SOS) propagating through the flow. Knowing the pressure and/or temperature of the flow and the speed of sound of the acoustical disturbances, the processing unit 24 can determine the mass flow rate, the consistency of the mixture (i.e., the mass/air ratio, the mass/liquid ratio, the liquid/air ratio), the volumetric flow rate, the density of the mixture, the enthalpy of the mixture, the Mach number of the mixture, the size of the particles within a mixture, and other parameters, which will be described in greater detail hereinafter.

The apparatus in FIG. 1 also contemplates providing one or more acoustic sources 27 to enable the measurement of the speed of sound propagating through the flow for instances of acoustically quiet flow. The acoustic sources may be disposed at the input end of output end of the probe, or at both ends as shown. One should appreciate that in most instances the acoustics sources are not necessary and the apparatus passively detects the acoustic ridge provided in the flow 12.

Figure 2:
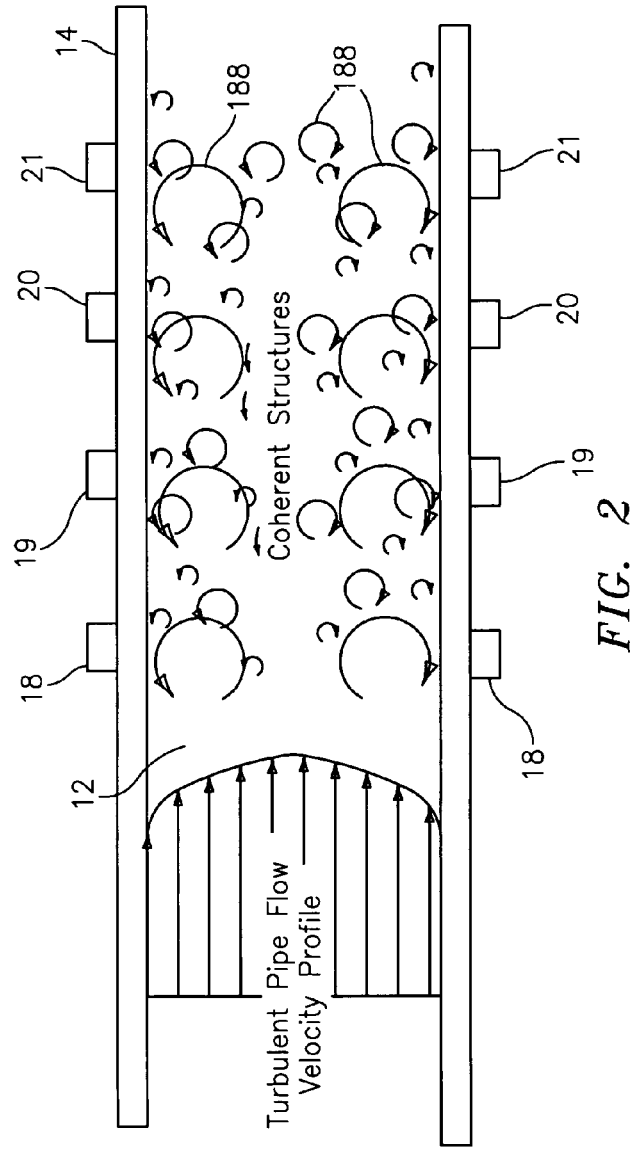
FIG. 2 is a cross-sectional view of a pipe and array of sensors showing the turbulent structures within the pipe, in accordance with the present invention.

The second technique measures the velocities associated with unsteady flow fields and/or pressure disturbances created by vortical disturbances or "eddies" 118 to determine the velocity of the flow 12. The pressure sensors 18-21 measure the unsteady pressures $P_1$-$P_4$ created by the vortical disturbances as these disturbances convect within the flow 12 through the pipe 14 in a known manner, as shown in FIG. 2. Therefore, the velocity of these vortical disturbances is related to the velocity of the mixture and hence the volumetric flow rate may be determined, as will be described in greater detail hereinafter.

In one embodiment of the present invention as shown in FIGS. 1 and 2, each of the pressure sensors 18-21 may include a piezoelectric film sensor 30 as shown in FIGS. 3 and 4 to measure the unsteady pressures of the mixture 12 using either technique described hereinbefore.

As best shown in FIGS. 3 and 4, the piezoelectric film sensors 30 include a piezoelectric material or film 32 to generate an electrical signal proportional to the degree that the material is mechanically deformed or stressed. The piezoelectric sensing element is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc.

Piezoelectric film ("piezofilm"), like piezoelectric material, is a dynamic material that develops an electrical charge proportional to a change in mechanical stress. Consequently, the piezoelectric material measures the strain induced within the pipe 14 due to unsteady pressure variations (e.g., vortical and/or acoustical) within the process mixture 12. Strain within the pipe is transduced to an output voltage or current by the attached piezoelectric sensor. The piezoelectrical material or film may be formed of a polymer, such as polarized fluoropolymer, polyvinylidene fluoride (PVDF).

FIGS. 3 and 4 illustrate a piezoelectric film sensor (similar to the sensor 18 of FIG. 1), wherein the piezoelectric film 32 is disposed between a pair of conductive coatings 34,35, such as silver ink. The piezoelectric film 32 and conductive coatings 34,35 are coated onto a protective sheet 36 (e.g., mylar) with a protective coating 38 disposed on the opposing side of the upper conductive coating. A pair of conductors 40,42 is attached to a respective conductive coating 34,35.

The thickness of the piezoelectric film 32 may be in the range of 8 um to approximately 110 um. The thickness is dependent on the degree of sensitivity desired or needed to measure the unsteady pressures within the pipe 14. The sensitivity of the sensor 30 increases as the thickness of the piezoelectric film increases.

The advantages of this technique of clamping the PVDF sensor 30 onto the outer surface of the pipe 14 are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to tube modes, e) differencing of sensors to eliminate acoustic noise from vortical signals.
5. Higher Operating Temperatures (125 C) (co-polymers)

As shown in FIGS. 5-9, the piezoelectric film sensor 30 is be adhered or attached to a strap 72 which is then clamped (or strapped) onto the outer surface of the pipe 14 at each respective axial location, similar to that described in U.S. Provisional Application No. 60/425,436, filed Nov. 12, 2002; and U.S. Provisional Application No. 60/426,724, which are incorporated herein by reference.

Figure 5:
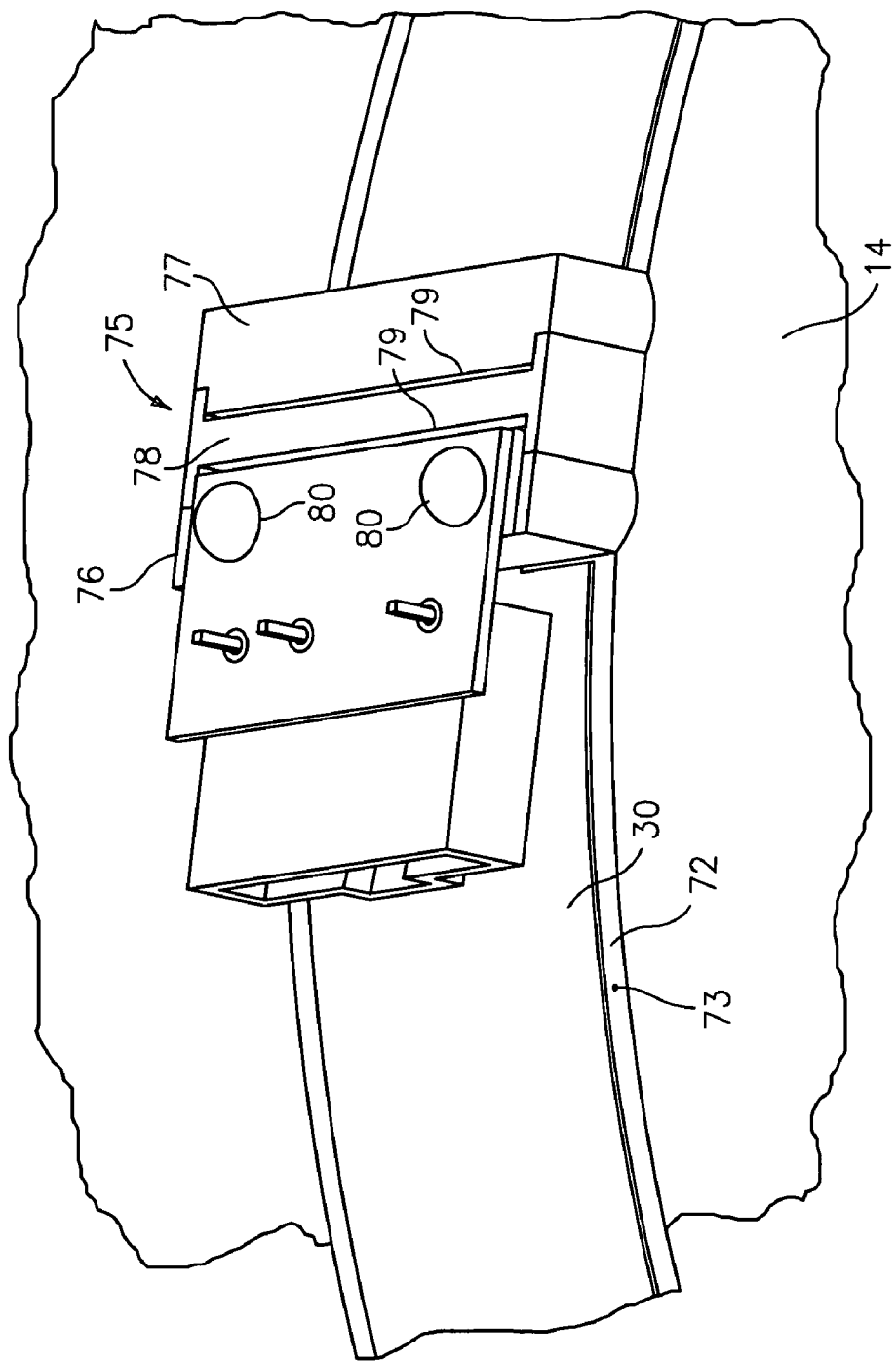
FIG. 5 is a cross-sectional view of a portion of the piezoelectric film sensor and clamp, in accordance with the present invention.

As shown in FIG. 5, the piezoelectric film sensor 30 is attached to the outer surface 73 of the strap in relation to the pipe 14. The conductive insulator 36 is attached to the outer surface of the strap by double side tape or any other appropriate adhesive. The adhesive is preferably flexible or compliant but minimizes creep between the strap and piezoelectric film sensor during the operation of the sensor 30. The length of the strap is substantially the same as the circumference of the pipe 14. The piezoelectric film sensor may extend over the substantial length of the strap or some portion less than the strap. In the embodiment shown in FIG. 5, the piezoelectric film sensor 30 extends substantially the length of the strap 72 to provide a circumferentially averaged pressure signal to the processing unit 24.

Figure 6:
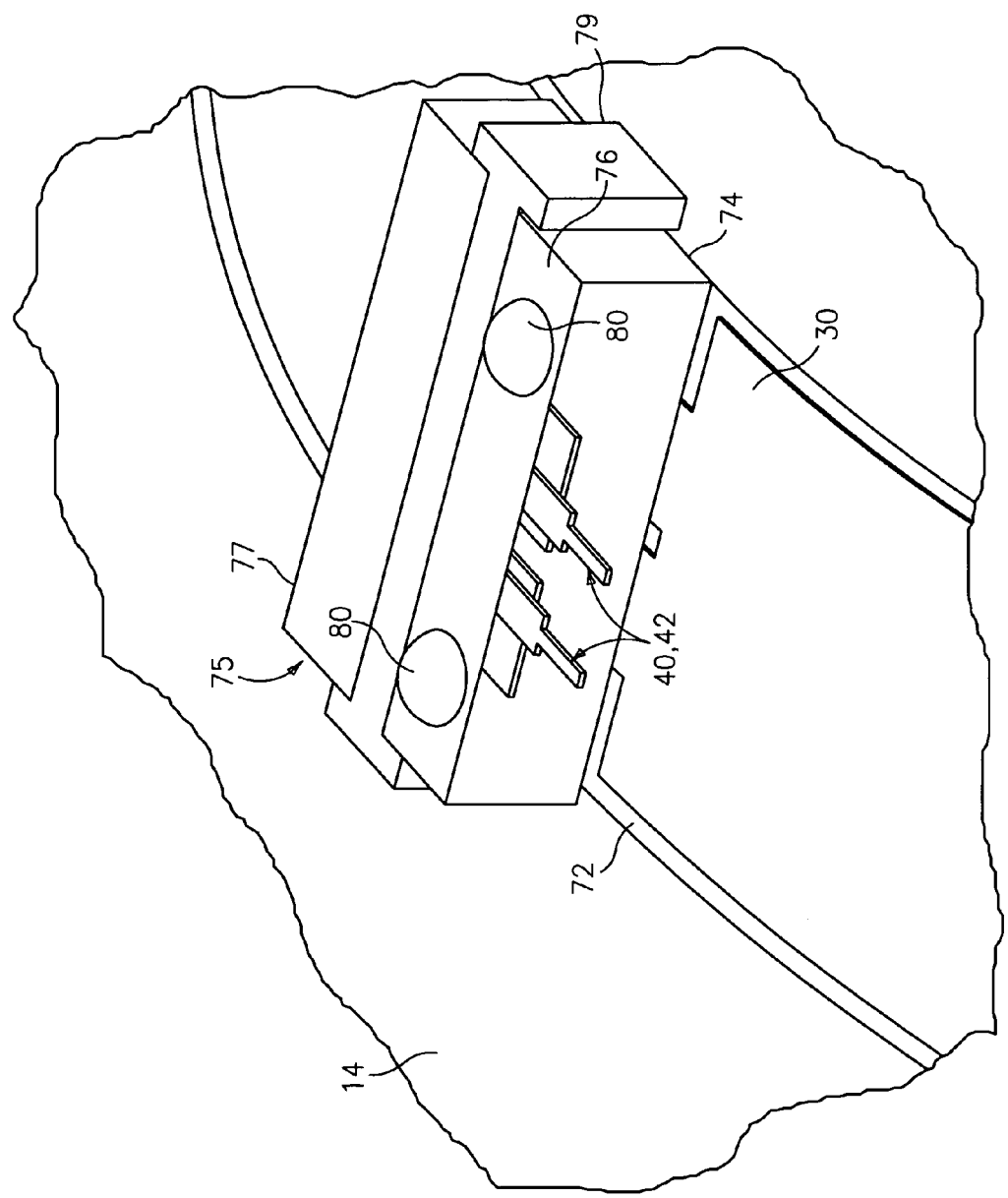
FIG. 6 is a cross-sectional view of a portion of the piezoelectric film sensor and clamp, in accordance with the present invention.
Figure 7:
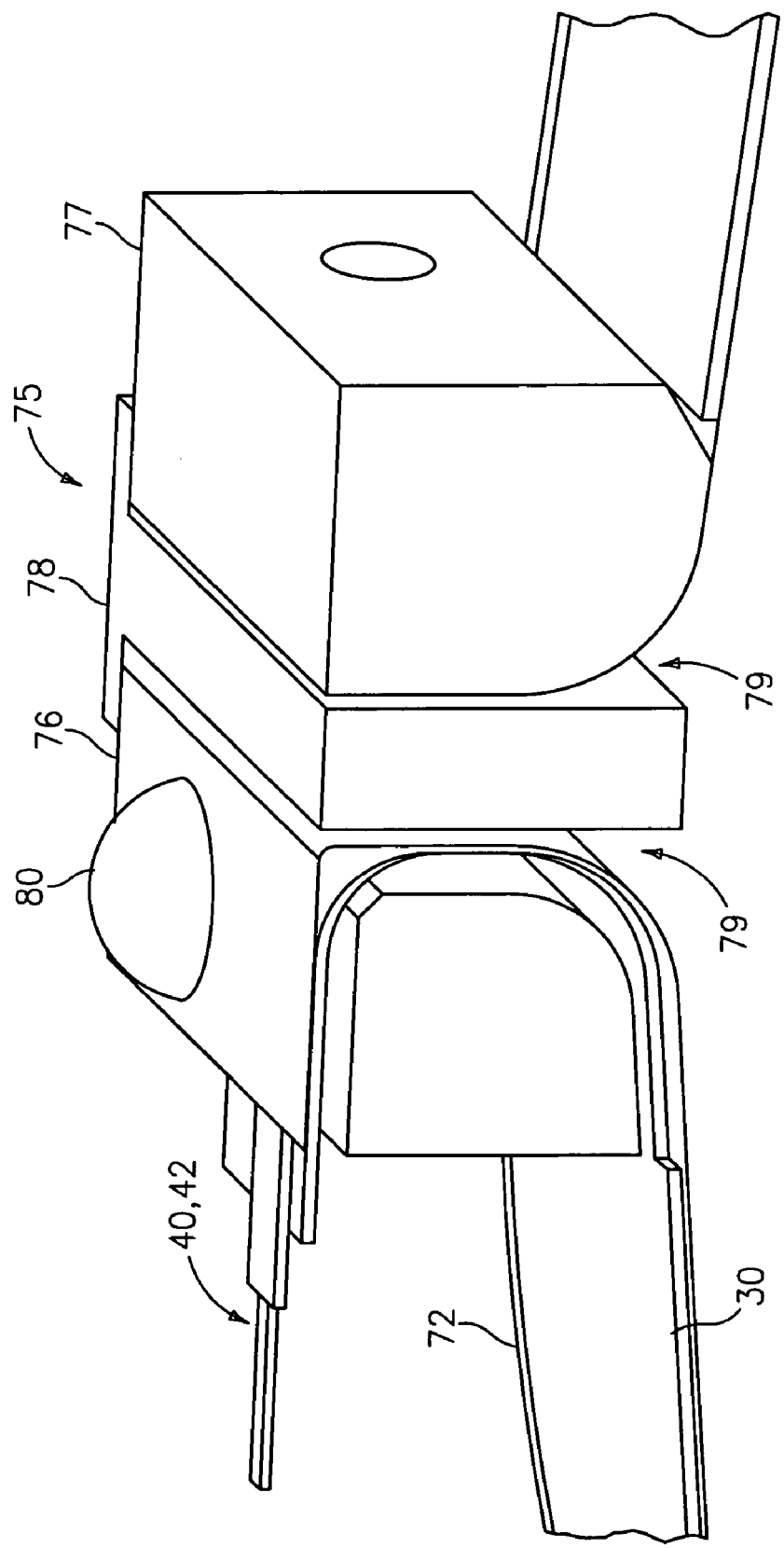
FIG. 7 is a cross-sectional view of a portion of the piezoelectric film sensor and clamp, in accordance with the present invention.
Figure 8:
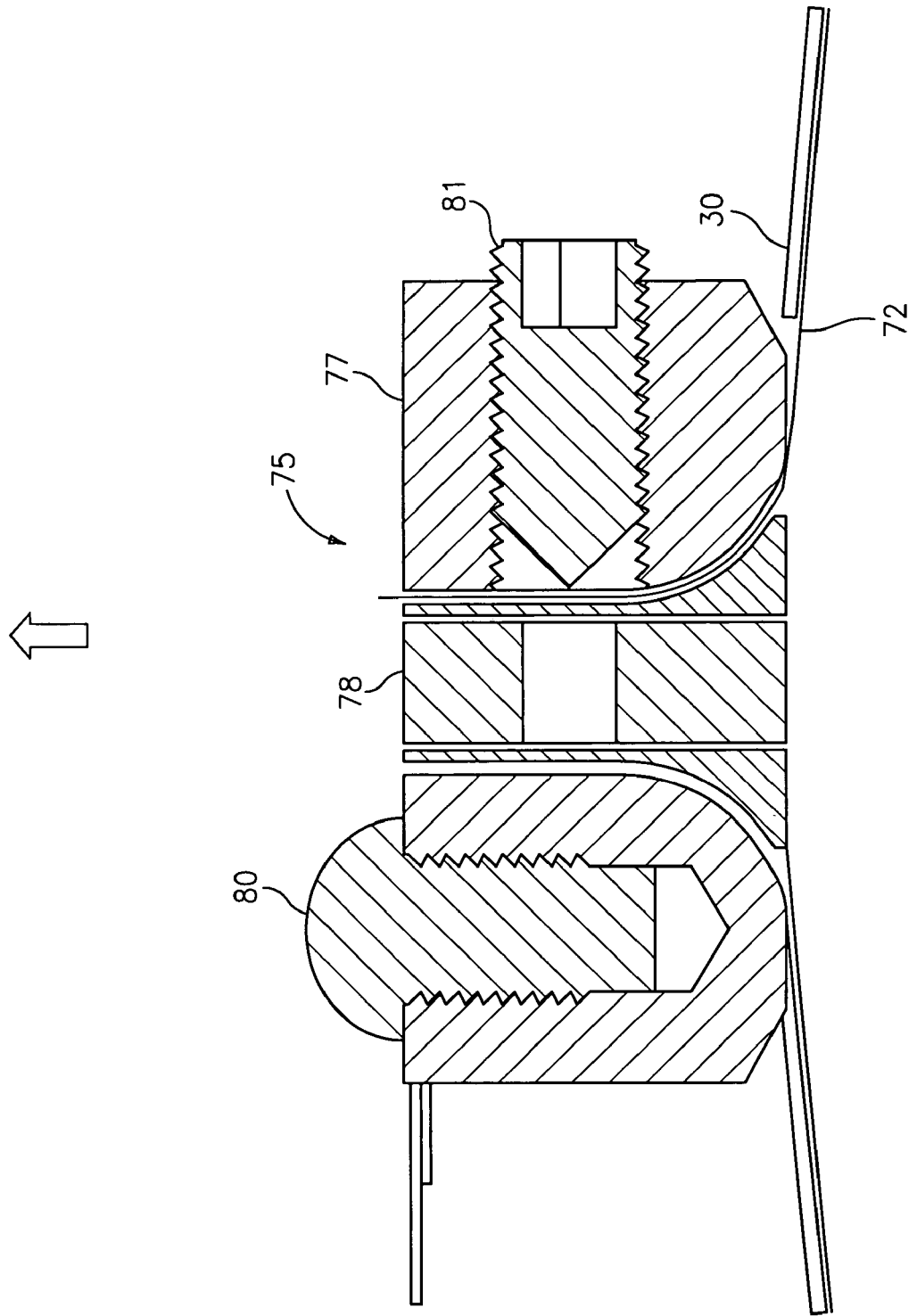
FIG. 8 is a side elevational view of a portion of the piezoelectric film sensor and clamp showing a step in the attachment of the clamp to the pipe, in accordance with the present invention.
Figure 9:
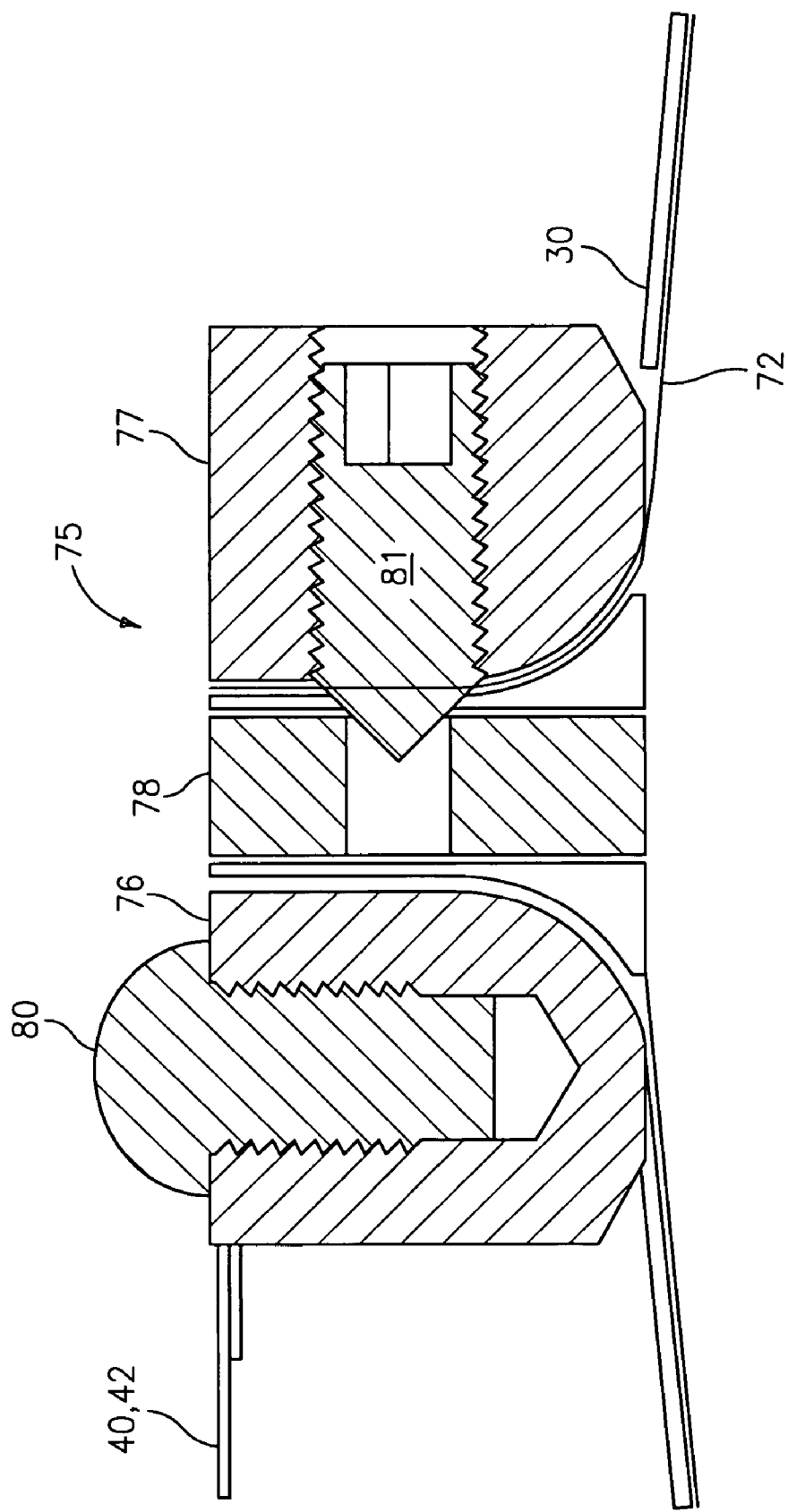
FIG. 9 is a side elevational view of a portion of the piezoelectric film sensor and clamp, in accordance with the present invention.

Referring to FIGS. 6 and 7, an attachment assembly 75 comprising a first attachment block 76, a second attachment block 77 and a spacer 78 disposed therebetween, which are welded together to provide slots 79 between each of the attachment blocks and the spacer. The slots receive respective ends of the strap 72 to secure the ends of the strap together. One end of the strap 72 and the pair of conductors 40,42 are threaded through the slot disposed between the first attachment block and the spacer. The strap 72 and conductors 40,42 are secured to the attachment assembly by a pair of fasteners 80. The other end of the strap is threaded through the slot disposed between the spacer and the second attachment block. Referring to FIG. 8, the other end of the strap is pull tightly between the spacer and the second attachment to draw up and take-up the tension and securely clamp the strap to the pipe 14. As shown in FIG. 9, a set screw 81 within the second attachment block is tighten, which then pierces the other end of the strap to secure it to the attachment assembly. The excess portion of the other end of the strap is then cut off. The piezoelectric film sensor may then be covered with a copper sheet to provide a grounding shield for EMI or other electrical noise.

While the piezoelectric film sensor 30 was mounted to the outer surface of the straps 72, the present invention contemplates the piezoelectric film sensor may be mounted to the inner surface of the strap, thereby resulting in the piezoelectric sensor being disposed between the strap and the outer surface of the pipe 14.

Figure 10:
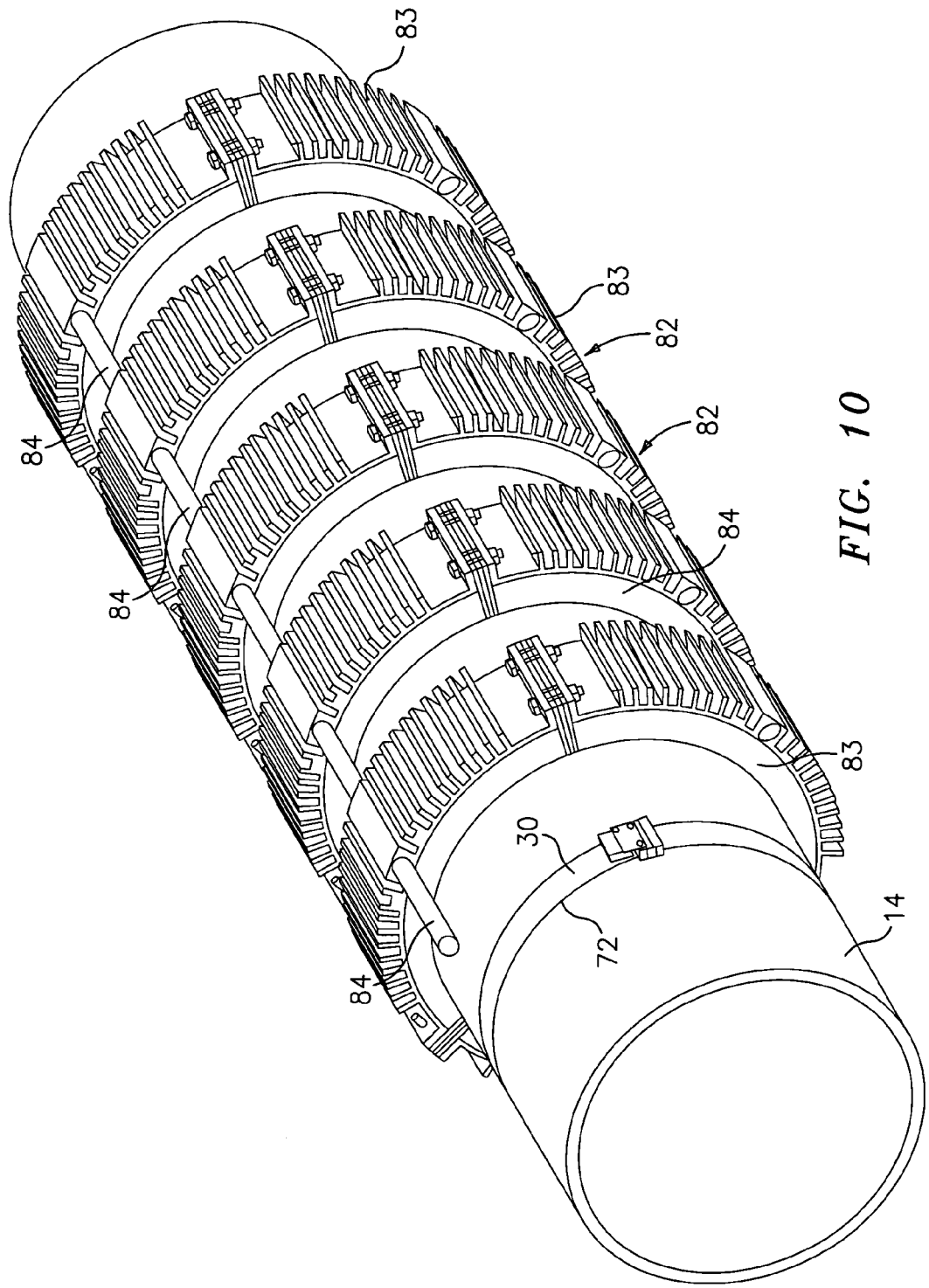
FIG. 10 is a perspective view of a plurality of piezoelectric film sensors clamped to a pipe having covers disposed thereover, in accordance with the present invention.
Figure 11:
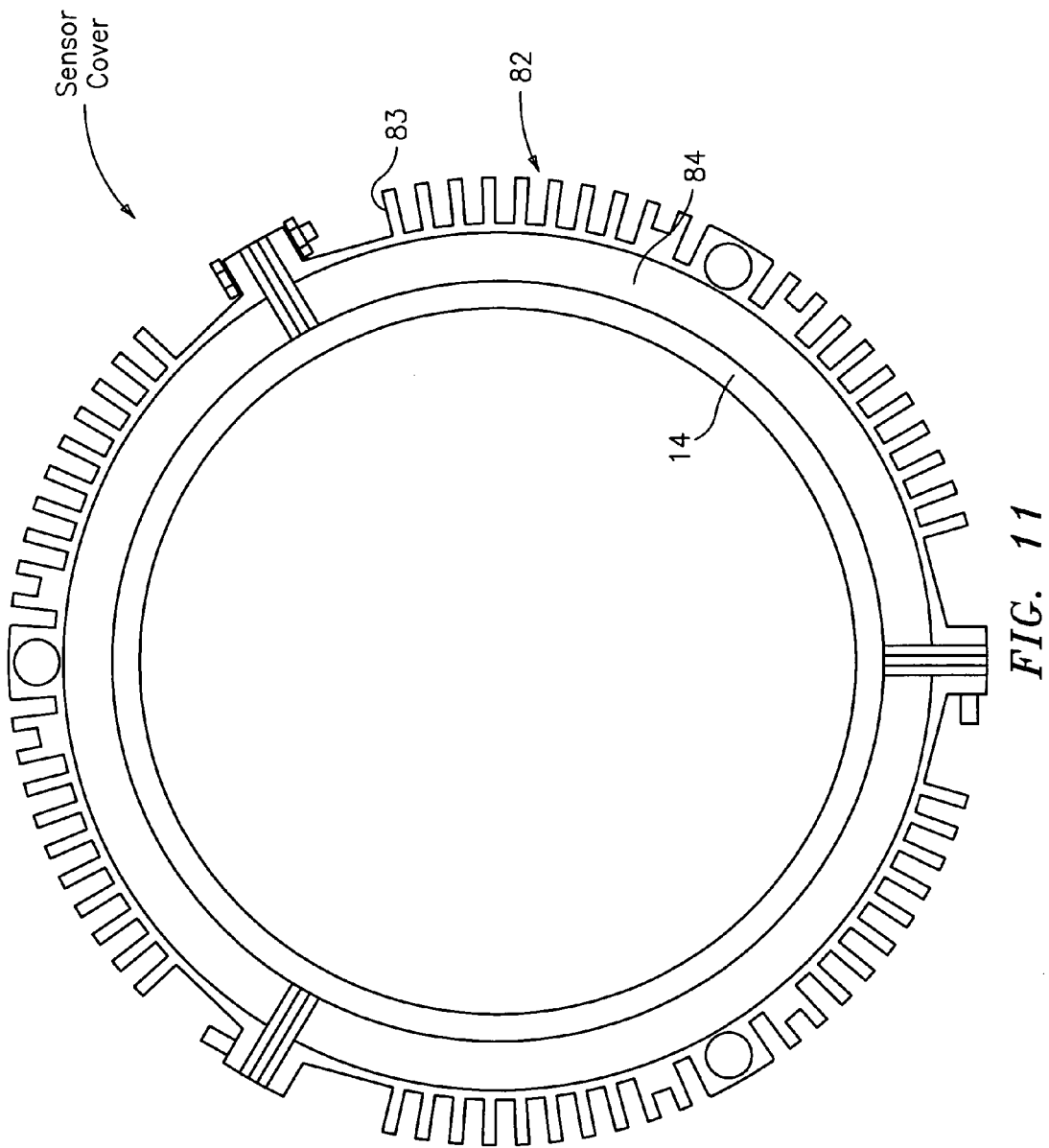
FIG. 11 is a cross sectional end view of a piezoelectric film sensor clamped to a pipe, in accordance with the present invention.

FIG. 10 illustrates a protective cover 82, having two halves, clamped onto the pipe and secured together over each of the piezoelectric film sensors 30 and straps 72. The protective cover is formed from aluminum with thermal fins 83 molded therein to assist with dissipating heat away from the sensors. The cover further includes an insulative portion 84 disposed between the pipe and the aluminum portion of the cover. The conductors and wiring thereto pass through a conduit 84 that extends between each of the covers.

While the present invention illustrates separate covers for each sensor, the present invention contemplates a single cover that covers all the sensors.

Figure 13:
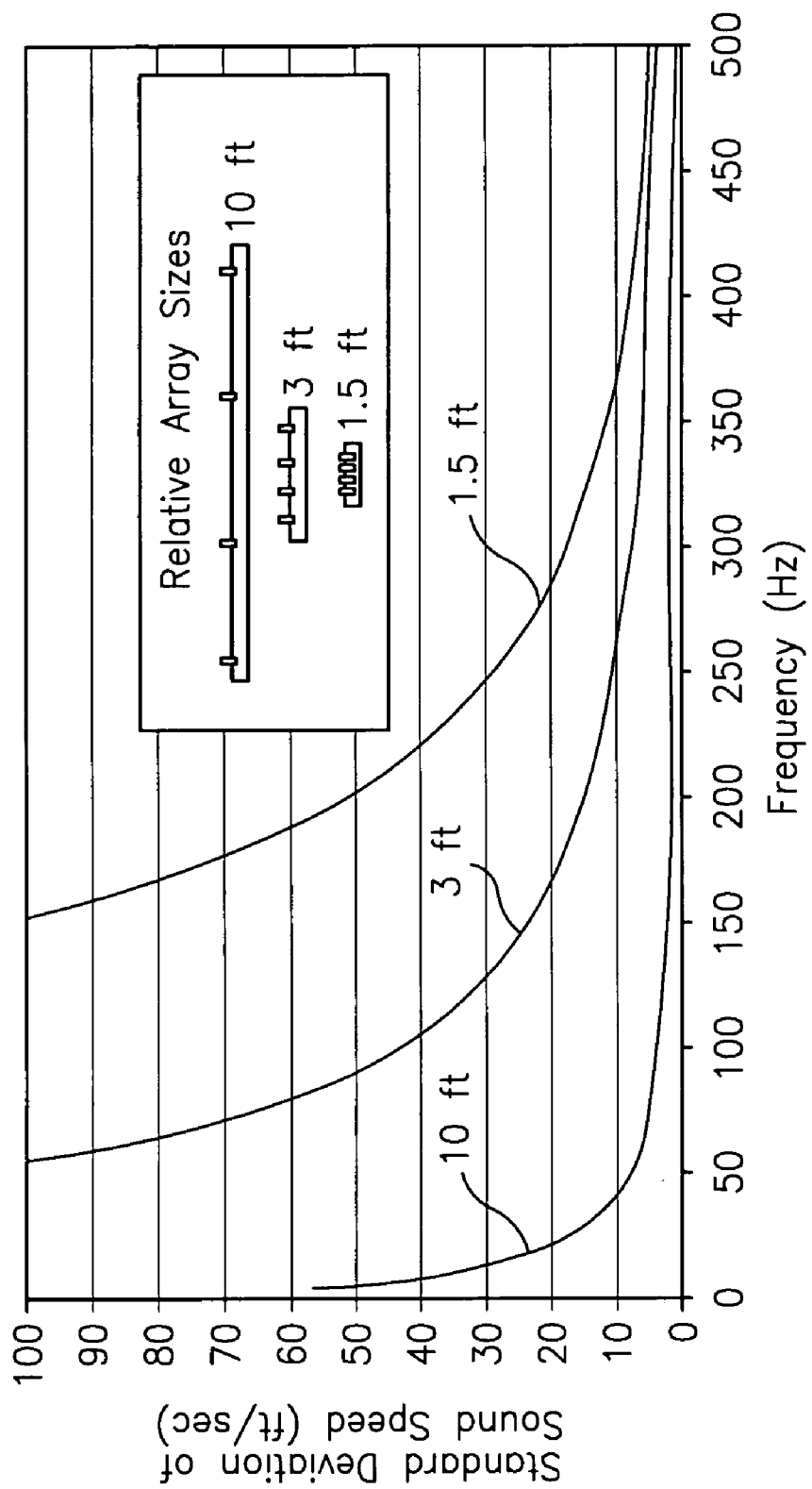
FIG. 13 is a plot showing the standard deviation of sound speed versus frequency for various arrays of process flow parameter measurement system, in accordance with the present invention.
Figure 14:
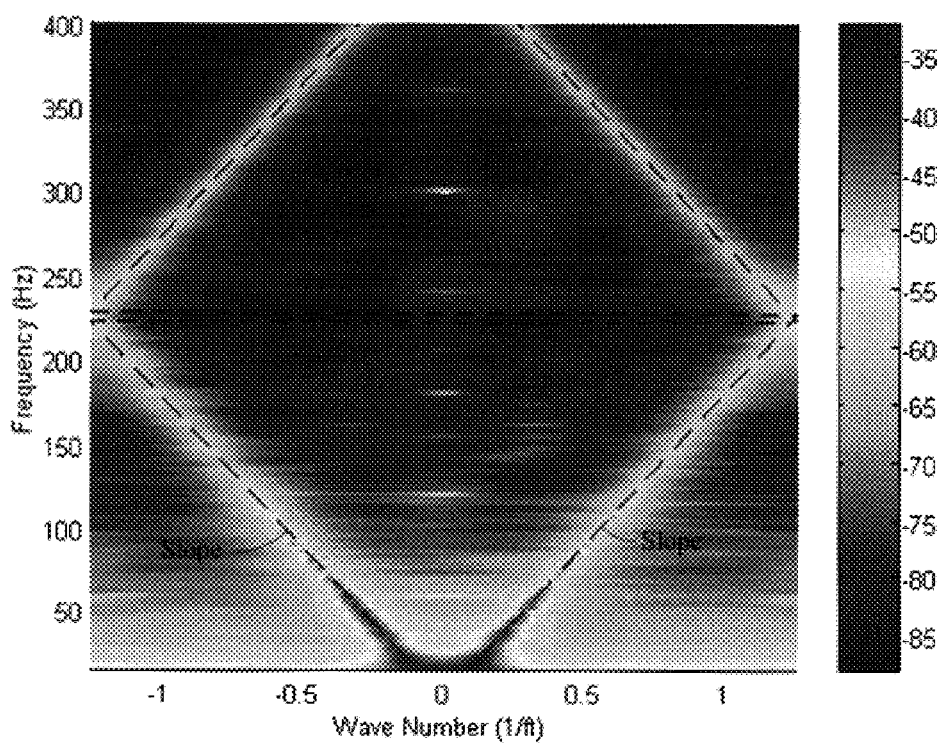
FIG. 14 is a k$\omega$ plot of data processed from an array of pressure sensors use to measure the speed of sound propagating through a saturated vapor/liquid mixture flowing in a pipe, in accordance with the present invention.

Referring to FIGS. 13 and 14, an apparatus 110, similar to apparatus 10 of FIG. 1, embodying the present invention is provided that measures at least one parameter/characteristic of a single and/or multiphase flow 12 flowing within a pipe 14. The apparatus may be configured and programmed to measure the speed of sound propagating through the flow 12 or measure the vortical disturbances propagating through the flow 12. In some instances, the apparatus 10 may be configured to measure both the speed of sound and the vortical disturbances. Depending on the configuration or embodiment, the apparatus can measure at least one of the following parameters of the flow 12: the wetness or steam quality (volumetric phase fraction), the volumetric flow rate, the size of the liquid particles, the mass flow, the enthalpy and the velocity of the mixture. To determine any one of these parameters, the apparatus 110 measures the unsteady pressures created by the speed of sound (SOS) and/or the vortical disturbances propagating through the single phase or multiphase flow 12 flowing in the pipe 14, which will be described in greater detail hereinafter.

The type of unsteady pressure measurement being made determines the spacing of the sensors. Measurement of unsteady vortical pressures require sensors spacing less than the coherence length of the vortical disturbances which is typically on the order of a pipe diameter. Correlation or array processing of the unsteady vortical pressure measurements between sensors is used to determine the bulk flow rate of the process mixture, which will be described in greater detail hereinafter.

Mass flow rates and other parameters are determined by measuring the speed of sound propagating within the process mixture 12. These parameters are determined by correlating or array processing unsteady pressure variations created by acoustic disturbances within the process mixture. In this case, the wavelength of the measured acoustic signal determines the sensor spacing. The desired wavelength of the measured acoustic signal is dependent upon the dispersion of particles in the mixture flow, which is dependent on the particle size. The larger the particle size is the longer the sensing device of the aperture.

Figure 12:
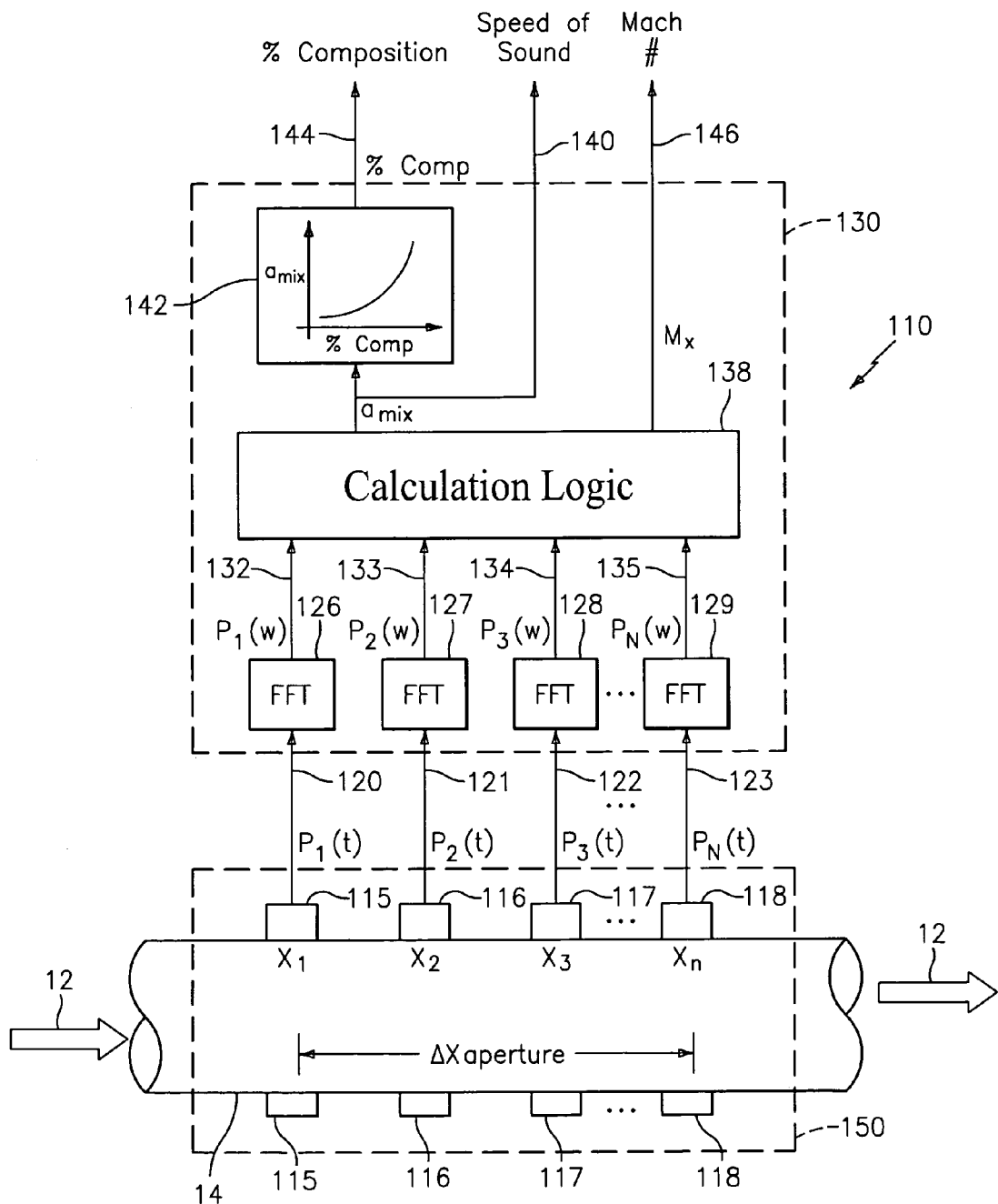
FIG. 12 is a block diagram of a probe for measuring the speed of sound propagating through a process flow flowing within a pipe, in accordance with the present invention.

As described hereinbefore, the apparatus 110 of the present invention may be configured and programmed to measure and process the detected unsteady pressures $P_1(t)$-$P_N(t)$ created by acoustic waves and/or vortical disturbances, respectively, propagating through the mixture to determine parameters of the mixture flow 12. One such apparatus 10 is shown in FIG. 12 that measures the speed of sound (SOS) of one-dimensional sound waves propagating through the vapor/liquid mixture to determine the composition the mixture. The apparatus 110 is also capable of determining the average size of the droplets, velocity of the mixture, enthalpy, mass flow, steam quality or wetness, density, and the volumetric flow rate of the single or multi-phase flow 12. It is known that sound propagates through various mediums at various speeds in such fields as SONAR and RADAR fields. The speed of sound propagating through the flow 12 within the pipe 14 may be determined using a number of known techniques, such as those set forth in U.S. patent application Ser. No. 09/344,094, entitled "Fluid Parameter Measurement in Pipes Using Acoustic Pressures", filed Jun. 25, 1999, now U.S. Pat. No. 6,354,147; U.S. patent application Ser. No. 09/729,994, filed Dec. 4, 2002, now U.S. Pat. No. 6,609,069; and U.S. patent application Ser. No. 10/007,749, entitled "Fluid Parameter Measurement in Pipes Using Acoustic Pressures", filed Nov. 7, 2001, each of which are incorporated herein by reference.

In accordance with the present invention, the speed of sound propagating through the process flow 12 is measured by passively listening to the flow with an array of unsteady pressure sensors to determine the speed at which one-dimensional compression waves propagate through the flow 12 contained within the pipe 14.

As shown in FIG. 13, the apparatus 110 has an array of at least three acoustic pressure sensors 115,116,117, located at three locations $x_1,x_2,x_3$ axially along the pipe 14. One will appreciate that the sensor array may include more than three pressure sensors as depicted by pressure sensor 118 at location $X_N$. The pressure generated by the acoustic waves may be measured through pressure sensors 115-118. The pressure sensors 15-18 provide pressure time-varying signals $P_1(t),P_2(t),P_3(t),P_N(t)$ on lines 120,121,122,123 to a signal processing unit 130 to known Fast Fourier Transform (FFT) logics 126, 127,128,129, respectively. The FFT logics 126-129 calculate the Fourier transform of the time-based input signals $P_1(t)$-$P_N(t)$ and provide complex frequency domain (or frequency based) signals $P_1(\omega),P_2(\omega),P_3(\omega),P_N(\omega)$ on lines 132,133, 134,135 indicative of the frequency content of the input signals. Instead of FFT'S, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

The frequency signals $P_1(\omega)$-$P_N(\omega)$ are fed to $a_{mix}$-Mx Calculation Logic 138 which provides a signal to line 40 indicative of the speed of sound of the multiphase mixture $a_{mix}$ (discussed more hereinafter). The $a_{mix}$ signal is provided to map (or equation) logic 142, which converts $a_{mix}$ to a percent composition of a mixture and provides a % Comp signal to line 44 indicative thereof (as discussed hereinafter). Also, if the Mach number Mx is not negligible and is desired, the calculation logic 138 may also provide a signal Mx to line 46 indicative of the Mach number Mx.

More specifically, for planar one-dimensional acoustic waves in a homogenous mixture, it is known that the acoustic pressure field P(x,t) at a location x along the pipe 14, where the wavelength λ of the acoustic waves to be measured is long compared to the diameter d of the pipe 14 (i.e., λ/d>>1), may be expressed as a superposition of a right traveling wave and a left traveling wave, as follows:

$$P(x, t) = (Ae^{-ik_r x} + Be^{+ik_l x})e^{i\omega t} \qquad \text{Eq. 1}$$

where A,B are the frequency-based complex amplitudes of the right and left traveling waves, respectively, x is the pressure measurement location along a pipe 14, ω is frequency (in rad/sec, where ω=2πf), and $k_r, k_l$ are wave numbers for the right and left traveling waves, respectively, which are defined as:

$$k_r \equiv \left(\frac{\omega}{a_{mix}}\right)\frac{1}{1 + M_x} \text{ and } k_l \equiv \left(\frac{\omega}{a_{mix}}\right)\frac{1}{1 - M_x} \qquad \text{Eq. 2}$$

where $a_{mix}$ is the speed of sound of the mixture in the pipe, ω is frequency (in rad/sec), and $M_x$ is the axial Mach number of the flow of the mixture within the pipe, where:

$$M_x \equiv \frac{V_{mix}}{a_{mix}} \qquad \text{Eq. 3}$$

where Vmix is the axial velocity of the mixture. For non-homogenous mixtures, the axial Mach number represents the average velocity of the mixture and the low frequency acoustic field description remains substantially unaltered.

The data from the array of sensors 115-118 may be processed in any domain, including the frequency/spatial domain, the temporal/spatial domain, the temporal/wave-number domain or the wave-number/frequency (k-ω) domain. As such, any known array processing technique in any of these or other related domains may be used if desired, similar to the techniques used in the fields of SONAR and RADAR.

Also, some or all of the functions within the signal processing unit 130 may be implemented in software (using a microprocessor or computer) and/or firmware, or may be implemented using analog and/or digital hardware, having sufficient memory, interfaces, and capacity to perform the functions described herein.

Acoustic pressure sensors 115-118 sense acoustic pressure signals that, as measured, are lower frequency (and longer wavelength) signals than those used for ultrasonic probes of the prior art, and thus the current invention is more tolerant to inhomogeneities in the flow, such as time and space domain inhomogeneities within the flow.

It is within the scope of the present invention that the pressure sensor spacing may be known or arbitrary and that as few as two sensors are required if certain information is known about the acoustic properties of the process flow 12. The pressure sensors are spaced sufficiently such that the entire length of the array (aperture) is at least a significant fraction of the measured wavelength of the acoustic waves being measured. The acoustic wavelength to be measured in a mixture is a function of at least the size and mass of the droplets/particles, and the viscosity of the vapor. The greater the size and mass of the droplets and/or the less viscous the vapor, the greater the spacing of the sensors is needed. Conversely, the smaller the size and mass of the droplets/particles and/or the more viscous the vapor, the shorter the spacing of the sensors is needed. For single phase flow, the acoustic wavelength is a function of the type or characteristics of flow 12.

Assuming that the droplets/particles of the mixture are small enough and the acoustic frequencies and the frequencies of perturbations associated with the acoustics are low enough for the droplets/particles of liquid to exhibit negligible slip (both steady and unsteady), the sound speed can be assumed to be substantially non-dispersive (that is constant with frequency) and the volumetric phase fraction of the mixture could be determined through the Wood equation:

$$\rho_{mix} = \sum_{i=1}^{N} \phi_i \rho_i$$

$$\frac{1}{\rho_{mix} a_{mix}^2} = \sum_{i=1}^{N} \frac{\phi_i}{\rho_i a_i^2}$$

$$\sum_{i=1}^{N} \phi_i = 1$$

For one-dimensional waves propagating, the compliance introduced by the pipe (in this case a circular tube of modulus E, radius R and wall thickness t) reduces the measured sound speed from the infinite dimensional sound speed. The effect of the conduit is given by the following relationship:

$$\frac{1}{\rho_{mix} c_{measured}^2} = \frac{1}{\rho_{mix} c_{mix}^2} + \sigma \text{ where } \sigma \equiv \frac{2R}{Et}$$

Utilizing the relations above for a vapor/liquid mixture, the speed at which sound travels within the representative vapor/liquid mixture is a function of vapor/liquid mass ratio. The effect of increasing liquid fraction, i.e. decreasing vapor/liquid ratio, is to decrease the sound speed. Physically, adding liquid droplets effectively mass loads the mixture, while not appreciably changing the compressibility of the air. Over the parameter range of interest, the relation between mixture sound speed and vapor/liquid ratio is well behaved and monatomic.

While the calibration curves based on predictions from first principles are encouraging, using empirical data mapping from sound speed to vapor/liquid ratio may result in improved accuracy of the present invention to measure the vapor/liquid fractions of the mixture.

The sound speed increases with increasing frequency and asymptotes toward a constant value. The sound speed asymptote at higher frequency is essentially the sound speed of air only with no influence of the suspended liquid droplets. Also, it is apparent that the sound speed of the vapor/liquid mixture has not reached the quasi-steady limit at the lowest frequency for which sound speed was measured. The sound speed is continuing to decrease at the lower frequency limit. An important discovery of the present invention is that the speed at which sound propagates through droplets suspended in a continuous vapor is said to be dispersive. As defined herein, the speed at which acoustic waves propagate through dispersive mixtures varies with frequency.

Measuring the sound speed of a saturated vapor/liquid mixture 12 at progressively lower and lower frequencies becomes inherently less accurate as the total length of the array of pressure sensors 115-118 ($\Delta x_{aperture}$), which define the aperture of the array, becomes small compared to the wavelength of the acoustics. In general, the aperture should be at least a significant fraction of a wavelength of the sound speed of interest. Consequently, longer arrays are used to resolve sound speeds at lower frequencies, which will be described in greater detail hereinafter. As shown in FIG. 14, the standard deviation associated with determining the speed of sound in air is shown as a function of frequency for three arrays of varying aperture, namely 1.5 ft, 3 ft and 10 ft.

For accurately measuring sound speeds at ultra-low frequencies, the data suggests that utilizing a quasi-steady model to interpret the relationship between sound speed, measured at frequencies above those at which the quasi-steady model is applicable, and the liquid-to-vapor ratio would be problematic, and may, in fact, be impractical. Thus, the key to understanding and interpreting the composition of vapor/liquid mixtures through sound speed measurements lies in the dispersive characteristics of the vapor/liquid mixture, which is described in greater detail in U.S. patent application Ser. No. 10/412,839, filed Apr. 10, 2003; U.S. patent application Ser. No. 10/349,716, filed Jan. 3, 2003; and U.S. patent application Ser. No. 10/376,427, filed Feb. 26, 2003, which are all incorporated herein by reference.

In accordance with the present invention the dispersive nature of the system utilizes a first principles model of the interaction between the vapor and liquid droplets. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous vapor phase and that of the droplets. The drag force on the droplets by the continuous vapor is modeled by a force proportional to the difference between the local vapor velocity and that of the liquid droplets and is balanced by inertial force:

$$F_{drag} = K(U_f - U_p) = \rho_p v_p \frac{\partial U_p}{\partial t}$$

where K=proportionality constant, $U_f$=fluid velocity, $U_p$=liquid droplet velocity, $\rho_p$=liquid droplet density and $v_p$=particle volume.

The effect of the force on the continuous vapor phase by the liquid droplets is modeled as a force term in the axial momentum equation. The axial momentum equation for a control volume of area A and length $\Delta x$ is given by:

$$P_x - P_{x+\Delta x} - K(U_f - U_p)\left\{\frac{\phi_p \Delta x}{v_p}\right\} = \frac{\partial}{\partial t}(\rho_f U_f \Delta x)$$

where P=pressure at locations x and $\Delta x$, $\phi_p$=volume fraction of the liquid droplets, $\rho_f$=vapor density.

The droplet drag force is given by:

$$F_{drag} = K(U_f - U_p) = C_d A_p \frac{1}{2} \rho_f (U_f - U_p)^2$$

where $C_d$=drag coefficient, $A_p$=frontal area of liquid droplet and $\rho_f$=vapor density.

Using Stokes law for drag on a sphere at low Reynold's number gives the drag coefficient as:

$$C_d = \frac{24}{\text{Re}} = \frac{24\mu}{\rho_f (U_f - U_p) D_p}$$

where $D_p$=droplet diameter and $\mu$=vapor viscosity.

Solving for K in this model yields:

$$K = 3\pi\mu D_p$$

Using the above relations and 1-dimensional acoustic modeling techniques, the following relation can be derived for the dispersive behavior of an idealized vapor/liquid mixture.

$$a_{mix}(\omega) = a_f \sqrt{\frac{1}{1 + \dfrac{\varphi_p \rho_p}{\rho_f\left(1 + \omega^2 \dfrac{\rho_p^2 v_p^2}{K^2}\right)}}}$$

In the above relation, the fluid SOS, density ($\rho$) and viscosity ($\phi$) are those of the pure phase fluid, $v_p$ is the volume of individual droplets and $\phi_p$ is the volumetric phase fraction of the droplets in the mixture. These relationships to determine droplet size and liquid to vapor mass ratio are described in U.S. patent application Ser. No. 10/412,839, filed Apr. 10, 2003; U.S. patent application Ser. No. 10/349,716, filed Jan. 3, 2003; and U.S. patent application Ser. No. 10/376,427, filed Feb. 26, 2003, which are all incorporated herein by reference.

The apparatus 10 further includes the ability to measure of volumetric flow rate of the mixture by comparing the difference of the speed of one dimensional sound waves propagating with and against the mean flow.

This method of determining the volumetric flow rate of the flow 12 relies on the interaction of the mean flow with the acoustic pressure field. The interaction results in sound waves propagating with the mean flow traveling at the speed of sound (if the vapor/liquid mixture were not flowing) plus the convection velocity and, conversely, sound waves traveling against the mean flow propagating at the speed of sound minus the convection velocity. That is, $$a_R = a_{mix} + u$$

$$a_L = a_{mix} - u$$

where $a_R$=velocity of a right traveling acoustic wave relative to a stationary observer (i.e. the tube 14), $a_L$=velocity of a left traveling acoustic wave apparent to a stationary observer, $a_{mix}$=speed of sound traveling through the mixture (if the mixture was not flowing) and u=the mean flow velocity (assumed to be flowing from left to right in this instance). Combining these two equations yields an equation for the mean velocity, $$u = \frac{a_R - a_L}{2}$$

Therefore, by measuring the propagation velocity of acoustic waves in both directions relative to the pipe 14 as described hereinbefore, the mean flow velocity can be calculated by multiplying the mean flow velocity by the cross-sectional area of the pipe 14.

The practicality of using this method to determine the mean flow is predicated on the ability to resolve the sound speed in both directions with sufficient accuracy to determine the volumetric flow.

For the sound speed measurement, the apparatus 10 utilizes similar processing algorithms as those employed herein before, and described in greater detail hereinafter. The temporal and spatial frequency content of sound propagating within the pipe 14 is related through a dispersion relationship.

$$\omega = \frac{k}{a_{mix}}$$

The wave number is k, which is defined as $k=2\pi/\lambda$, $\omega$ is the temporal frequency in rad/sec, and $a_{mix}$ is the speed at which sound propagates within the process piping. For this cases where sound propagates in both directions, the acoustic power is located along two acoustic ridges, one for the sound traveling with the flow at a speed of $a_{mix}+V_{mix}$ and one for the sound traveling against the flow at a speed of $a_{mix}-V_{mix}$.

Further, FIG. 14 illustrates the ability of the present invention to determine the velocity of a fluid moving in a pipe. The color contours represent the relative signal power at all combinations of frequency and wavenumber. The highest power "ridges" represent the acoustic wave with slope of the ridges equal to the propagation speed. Note that the acoustic ridges "wrap" to the opposite side of the plot at the spatial Nyquist wavenumber equal to ±3.14 in this case (i.e. the acoustic ridge that slopes up and to the right starting at the bottom of the plot, the right-side ridge, wraps to the left side of the plot at approximately 550 Hz and continues sloping up and to the right). The dashed lines show the best-fit two-variable maximization of the power with the two variables being sound speed and flow velocity. The right-side ridge represents the acoustic wave traveling in the same direction as the bulk flow and therefore its slope is steeper than the left-side ridge that represents the acoustic wave traveling in the opposite direction of the flow. This indicates that the acoustic wave traveling in the same direction of the flow is traveling faster than the acoustic wave traveling in the opposite direction of the flow relative to the stationary sensors located on the probe.

Referring to FIG. 1, an apparatus 10 embodying the present invention includes the ability to measure volumetric flow rate of the mixture by measuring the unsteady pressures generated by vortical disturbance propagating in the mixture. The apparatus 10 uses one or both of the following techniques to determine the convection velocity of the vortical disturbances within the process flow 12 by:

1) Cross-correlating unsteady pressure variations using an array of unsteady pressure sensors.

2) Characterizing the convective ridge of the vortical disturbances using an array of unsteady pressure sensors.

The overwhelming majority of industrial process flows involve turbulent flow. Turbulent fluctuations within the process flow govern many of the flow properties of practical interest including the pressure drop, heat transfer, and mixing. For engineering applications, considering only the time-averaged properties of turbulent flows is often sufficient for design purposes. For sonar flow metering technology, understanding the time-averaged velocity profile in turbulent flow provides a means to interpret the relationship between speed at which coherent structures convect and the volumetrically averaged flow rate.

From the saturated vapor/liquid mixture mechanics perspective, this method relies on the ability of the apparatus 10 to isolate the convective pressure field (which convects at or near the mean velocity of the saturated vapor/liquid mixture) from the acoustic pressure field (which propagates at the at the speed of sound). In this sense, the velocity measurement is independent of the sound speed measurement.

For turbulent flows 12, the time-averaged axial velocity varies with radial position from zero at the wall to a maximum at the centerline of the pipe 14. The flow near the wall is characterized by steep velocity gradients and transitions to relatively uniform core flow near the center of the pipe 14. FIG. 2 shows a representative schematic of a velocity profile and coherent vortical flow structures 188 present in fully developed turbulent flow 12. The vortical structures 188 are superimposed over time averaged velocity profile within the pipe 14 and contain temporally and spatially random fluctuations with magnitudes typically less than 10% percent of the mean flow velocity.

From a volumetric flow measurement perspective, the volumetrically averaged flow velocity is of interest. The volumetrically averaged flow velocity, defined as V=Q/A, is a useful, but arbitrarily defined property of the flow. Here, A is the cross sectional area of the tube and Q is the volumetric flow rate. In fact, given the velocity profile within the tube, little flow is actually moving at this speed.

Turbulent pipe flows 12 are highly complex flows. Predicting the details of any turbulent flow is problematic, however, much is known regarding the statistical properties of the flow. For instance, turbulent flows contain self-generating, coherent vortical structures often termed "turbulent eddies". The maximum length scale of these eddies is set by the diameter of the pipe 14. These structures remain coherent for several tube diameters downstream, eventually breaking down into progressively smaller eddies until the energy is dissipated by viscous effects.

Experimental investigations have established that eddies generated within turbulent boundary layers convect at roughly 80% of maximum flow velocity. For tube flows, this implies that turbulent eddies will convect at approximately the volumetrically averaged flow velocity within the pipe 14. The precise relationship between the convection speed of turbulent eddies and the flow rate for each class of meters can be calibrated empirically as described below.

Figure 15:
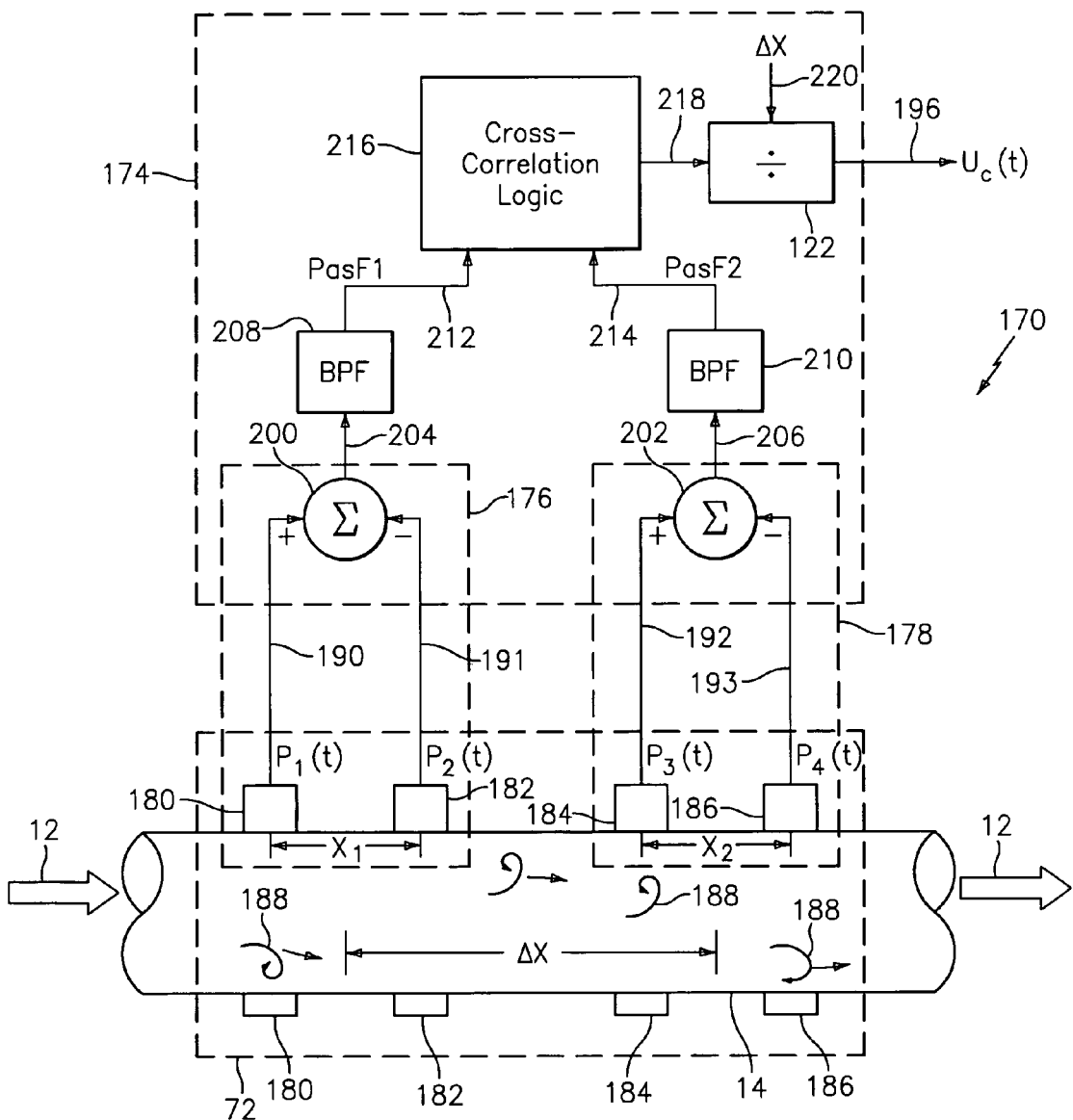
FIG. 15 is a block diagram of an apparatus for measuring the vortical field of a process flow within a pipe, in accordance with the present invention.

The apparatus 170 of FIG. 15 determines the convection velocity of the vortical disturbances within the flow by cross correlating unsteady pressure variations using an array of unsteady pressure sensors, similar to that shown in U.S. patent application Ser. No. 10/007,736, filed Nov. 8, 2001, entitled "Flow Rate Measurement Using Unsteady Pressures", which is incorporated herein by reference.

Referring to FIG. 15, the apparatus 170 includes a sensing section 172 along a pipe 14 and a signal processing unit 174. The pipe 14 has two measurement regions 176,178 located a distance ΔX apart along the pipe 14. At the first measurement region 176 are two unsteady (or dynamic or ac) pressure sensors 180,182, located a distance $X_1$ apart, capable of measuring the unsteady pressure in the pipe 14, and at the second measurement region 178, are two other unsteady pressure sensors 84,86, located a distance $X_2$ apart, capable of measuring the unsteady pressure in the pipe 14. Each pair of pressure sensors 180,182 and 184,186 act as spatial filters to remove certain acoustic signals from the unsteady pressure signals, and the distances $X_1,X_2$ are determined by the desired filtering characteristic for each spatial filter, as discussed hereinafter.

The apparatus 170 of the present invention measures velocities associated with unsteady flow fields and/or pressure disturbances represented by 188 associated therewith relating to turbulent eddies (or vortical flow fields), inhomogeneities in the flow, or any other properties of the flow, liquid, vapor, or pressure, having time varying or stochastic properties that are manifested at least in part in the form of unsteady pressures. The vortical flow fields are generated within the flow of the pipe 14 by a variety of non-discrete sources such as remote machinery, pumps, valves, elbows, as well as the fluid or mixture flow itself. It is this last source, the fluid flowing within the pipe, that is a generic source of vortical flow fields primarily caused by the shear forces between the flow 12 and the wall of the tube that assures a minimum level of disturbances for which the present invention takes unique advantage. The flow generated vortical flow fields generally increase with mean flow velocity and do not occur at any predeterminable frequency. As such, no external discrete vortex-generating source is required within the present invention and thus may operate using passive detection. It is within the scope of the present that the pressure sensor spacing may be known or arbitrary and that as few as two sensors are required if certain information is known about the acoustic properties of the system as will be more fully described herein below.

The vortical flow fields 188 are, in general, comprised of pressure disturbances having a wide variation in length scales and which have a variety of coherence length scales such as that described in the reference "Sound and Sources of Sound", A. P. Dowling et al, Halsted Press, 1983, which is incorporated by reference to the extend of understanding the invention. Certain of these vortical flow fields 188 convect at or near, or related to the mean velocity of at least one of the elements within a mixture flowing through the pipe 14. The vortical pressure disturbances 188 that contain information regarding convection velocity have temporal and spatial length scales as well as coherence length scales that differ from other disturbances in the flow. The present invention utilizes these properties to preferentially select disturbances of a desired axial length scale and coherence length scale as will be more fully described hereinafter. For illustrative purposes, the terms vortical flow field and vortical pressure field will be used to describe the above-described group of unsteady pressure fields having temporal and spatial length and coherence scales described herein.

Also, some or all of the functions within the signal processing unit 174 may be implemented in software (using a microprocessor or computer) and/or firmware, or may be implemented using analog and/or digital hardware, having sufficient memory, interfaces, and capacity to perform the functions described herein.

In particular, in the processing unit 174, the pressure signal $P_1(t)$ on the line 190 is provided to a positive input of a summer 200 and the pressure signal $P_2(t)$ on the line 191 is provided to a negative input of the summer 200. The output of the summer 200 is provided to line 204 indicative of the difference between the two pressure signals $P_1,P_2$ (e.g., $P_1-P_2=P_{as1}$).

The pressure sensors 180,182 together with the summer 200 create a spatial filter 176. The line 204 is fed to bandpass filter 208, which passes a predetermined passband of frequencies and attenuates frequencies outside the passband. In accordance with the present invention, the passband of the filter 208 is set to filter out (or attenuate) the dc portion and the high frequency portion of the input signals and to pass the frequencies therebetween. Other passbands may be used in other embodiments, if desired. Passband filter 208 provides a filtered signal $P_{asf}1$ on a line 212 to Cross-Correlation Logic 216, described hereinafter.

The pressure signal $P_3(t)$ on the line 192 is provided to a positive input of a summer 202 and the pressure signal $P_4(t)$ on the line 193 is provided to a negative input of the summer 202. The pressure sensors 83,84 together with the summer 202 create a spatial filter 178. The output of the summer 202 is provided on a line 206 indicative of the difference between the two pressure signals $P_3,P_4$ (e.g., $P_3-P_4=P_{as2}$). The line 206 is fed to a bandpass filter 210, similar to the bandpass filter 108 discussed hereinbefore, which passes frequencies within the passband and attenuates frequencies outside the passband. The filter 210 provides a filtered signal $P_{asf}2$ on a line 214 to the Cross-Correlation Logic 216. The signs on the summers 200,202 may be swapped if desired, provided the signs of both summers are swapped together. In addition, the pressure signals $P_1,P_2,P_3,P_4$ may be scaled prior to presentation to the summers 200,202.

The Cross-Correlation Logic 216 calculates a known time domain cross-correlation between the signals $P_{asf1}$ and $P_{asf2}$ on the lines 212,214, respectively, and provides an output signal on a line 218 indicative of the time delay τ it takes for an vortical flow field 188 (or vortex, stochastic, or vortical structure, field, disturbance or perturbation within the flow) to propagate from one sensing region 176 to the other sensing region 178. Such vortical flow disturbances, as is known, are coherent dynamic conditions that can occur in the flow which substantially decay (by a predetermined amount) over a predetermined distance (or coherence length) and convect (or flow) at or near the average velocity of the fluid flow. As described above, the vortical flow field 188 also has a stochastic or vortical pressure disturbance associated with it. In general, the vortical flow disturbances 188 are distributed throughout the flow, particularly in high shear regions, such as boundary layers (e.g., along the inner wall of the tube 14) and are shown herein as discrete vortical flow fields 188. Because the vortical flow fields (and the associated pressure disturbance) convect at or near the mean flow velocity, the propagation time delay τ is related to the velocity of the flow by the distance ΔX between the measurement regions 176, 178, as discussed hereinafter.

Referring to FIG. 15, a spacing signal ΔX on a line 220 indicative of the distance ΔX between the sensing regions 176,178 is divided by the time delay signal τ on the line 218 by a divider 222 which provides an output signal on the line 196 indicative of the convection velocity $U_c(t)$ of the saturated vapor/liquid mixture flowing in the pipe 14, which is related to (or proportional to or approximately equal to) the average (or mean) flow velocity $U_f(t)$ of the flow 12, as defined below:

$$U_c(t) = \Delta X/\tau \propto U_f(t) \qquad \text{Eq. 1}$$

The present invention uses temporal and spatial filtering to precondition the pressure signals to effectively filter out the acoustic pressure disturbances $P_{acoustic}$ and other long wavelength (compared to the sensor spacing) pressure disturbances in the tube 14 at the two sensing regions 176,178 and retain a substantial portion of the vortical pressure disturbances $P_{vortical}$ associated with the vortical flow field 188 and any other short wavelength (compared to the sensor spacing) low frequency pressure disturbances $P_{other}$. In accordance with the present invention, if the low frequency pressure disturbances $P_{other}$ are small, they will not substantially impair the measurement accuracy of $P_{vortical}$.

The second technique of determining the convection velocity of the vortical disturbances within the flow 12 is by characterizing the convective ridge of the vortical disturbances using an array of unsteady pressure sensors, similar to that shown in U.S. patent application Ser. No. 09/729,994, filed Dec. 4, 2000, entitled "Method and Apparatus for Determining the Flow Velocity Within a Pipe", which is incorporated herein by reference.

The sonar flow metering methodology uses the convection velocity of coherent structure with turbulent pipe flows 12 to determine the volumetric flow rate. The convection velocity of these eddies 188 is determined by applying sonar arraying processing techniques to determine the speed at which the eddies convect past an axial array of unsteady pressure measurements distributed along the pipe 14.

The sonar-based algorithms determine the speed of the eddies 188 by characterizing both the temporal and spatially frequency characteristics of the flow field. For a train of coherent eddies convecting past a fixed array of sensors, the temporal and spatial frequency content of pressure fluctuations are related through the following relationship:

$$\omega = \frac{k}{U_{convect}}$$

Here k is the wave number, defined as $k=2\pi/\lambda$ and has units of 1/length, $\omega$ is the temporal frequency in rad/sec, and $U_{convect}$ is the convection velocity. Thus, the shorter the wavelength (larger k) is, the higher the temporal frequency.

In sonar array processing, the spatial/temporal frequency content of time stationary sound fields are often displayed using "k-$\omega$ plots". K-$\omega$ plots are essentially three-dimensional power spectra in which the power of a sound field is decomposed into bins corresponding to specific spatial wave numbers and temporal frequencies. On a k-$\omega$ plot, the power associated with a pressure field convecting with the flow is distributed in regions, which satisfies the dispersion relationship developed above. This region is termed "the convective ridge" (Beranek, 1992) and the slope of this ridge on a k-w plot indicates the convective velocity of the pressure field. This suggests that the convective velocity of turbulent eddies, and hence flow rate within a tube, can be determined by constructing a k-$\omega$ plot from the output of a phased array of sensor and identifying the slope of the convective ridge.

Figure 16:
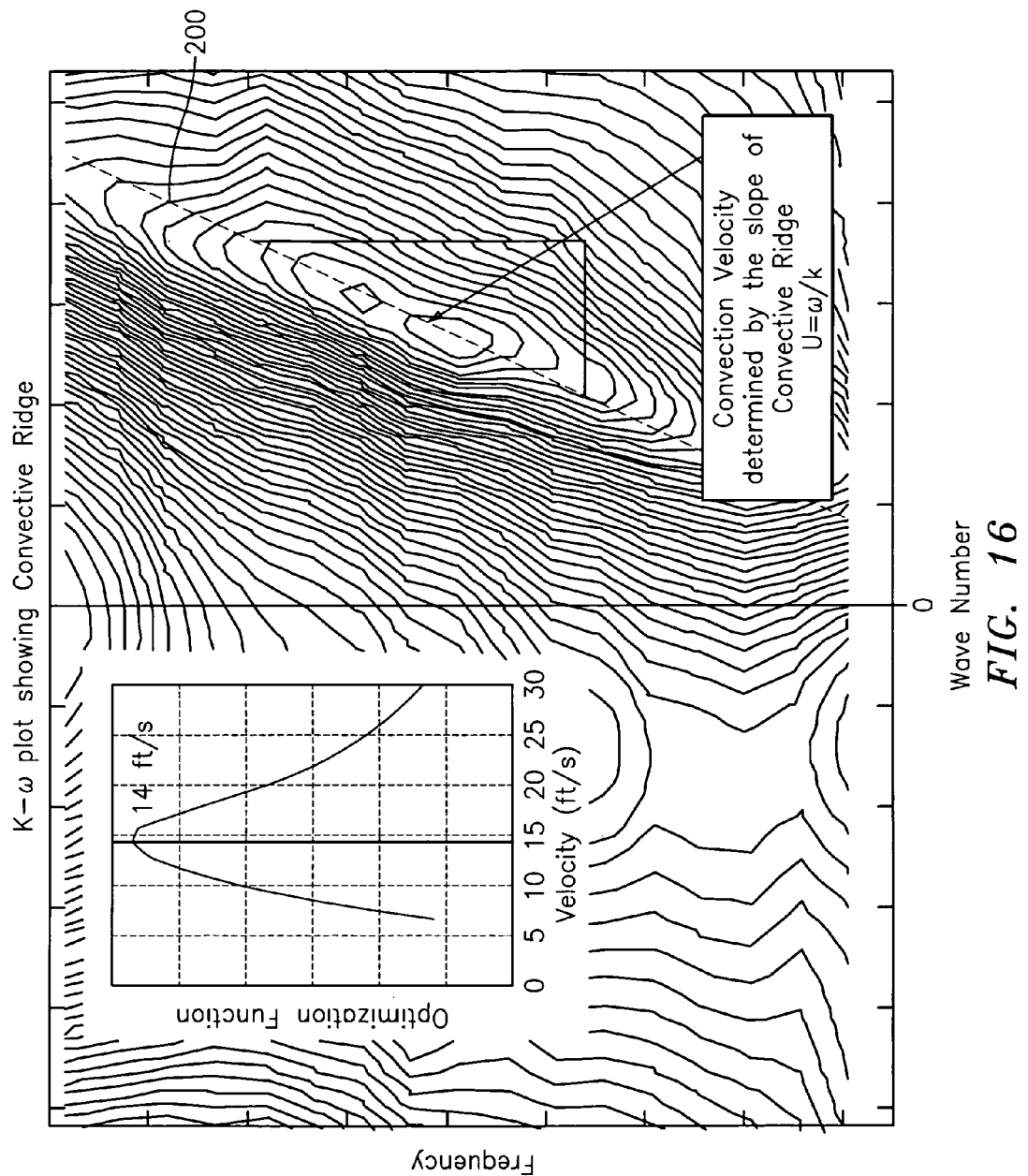
FIG. 16 is a k$\omega$ plot of data processed from an apparatus embodying the present invention that illustrates slope of the convective ridge, and a plot of the optimization function of the convective ridge, in accordance with the present invention.

FIG. 16 shows an example of a k-$\omega$ plot generated from a phased array of pressure sensors. The power contours show a well-defined convective ridge. A parametric optimization method was used to determine the "best" line representing the slope of the convective ridge 200. For this case, a slope of 14.2 ft/sec was determined. The intermediate result of the optimization procedure is displayed in the insert, showing that optimized value is a unique and well-defined optima.

The k-w plot shown in FIG. 16 illustrates the fundamental principle behind sonar based flow measure, namely that axial arrays of pressure sensors can be used in conjunction with sonar processing techniques to determine the speed at which naturally occurring turbulent eddies convect within a pipe.

Figure 17:
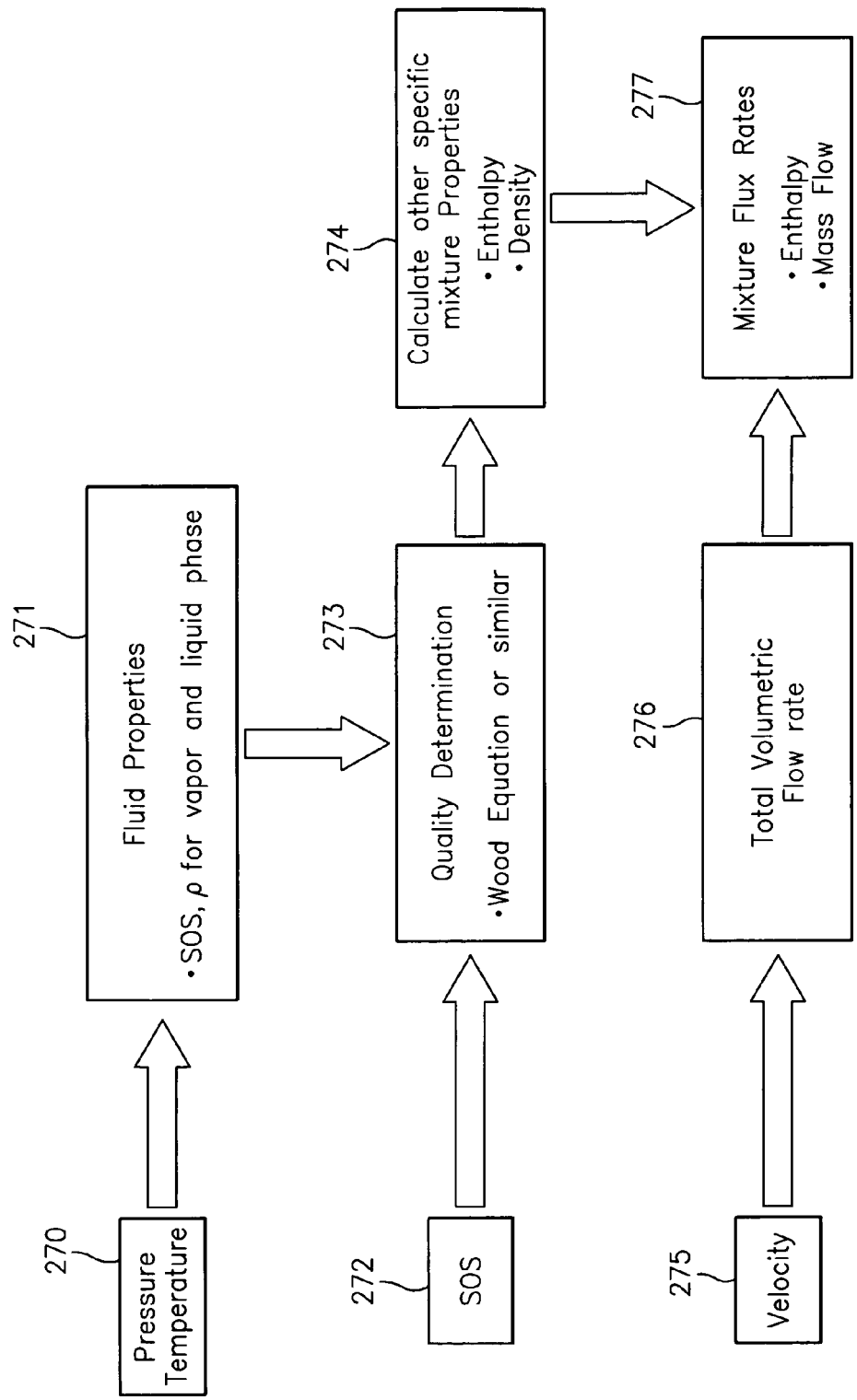
FIG. 17 is a functional flow diagram of an apparatus embodying the present invention.

The present invention will now be described with reference to FIG. 17 wherein the discussions based on the calculation of various parameters and properties are detailed herein above with reference to the various Figures. In accordance with the present invention utilizing a probe 10,110,170 to determine the speed of sound propagating through a flow 12, such as a mixture, provides various specific properties of a mixture and the velocity of the mixture and further utilizing logic comprising information about the flow 12 based on the measured parameters. The steady state pressure and temperature of the mixture may be measured by any known or contemplated method as represented by 270 from which various fluid properties may be determined from tables or graphs of the known relationships for speed of sound and density for the two phases of the mixture as represented by 271. The speed of sound propagating through the mixture is determined by the apparatus 10,110,170 of the present invention as set forth herein above and represented by 272. The quality of the saturated vapor/liquid mixture is determined from the fluid properties of 271 combined with the mixture speed of sound 272 using the Wood equation (or similar) as set forth herein above and represented by 273. The present invention also enables the determination of other properties of the mixture such as enthalpy and density as set forth by 274 by combining the fluid properties of 271 with the quality or composition of the mixture from 273. The present invention further enables the determination of the velocity of the mixture by the methods described herein above as represented by 275. The total volumetric flow rate of the mixture is thereby determined as represented by 276 and when combined with the parameters of other properties of the mixture such as enthalpy and density as set forth by 274 various flux rates of the mixture such as enthalpy and mass flow rates are enabled as represented by 277.

Another embodiment of the present invention include a pressure sensor such as pipe strain sensors, accelerometers, velocity sensors or displacement sensors, discussed hereinafter, that are mounted onto a strap to enable the pressure sensor to be clamped onto the pipe. The sensors may be removable or permanently attached via known mechanical techniques such as mechanical fastener, spring loaded, clamped, clam shell arrangement, strapping or other equivalents. These certain types of pressure sensors, it may be desirable for the pipe 12 to exhibit a certain amount of pipe compliance.

Instead of single point pressure sensors 18-21, at the axial locations along the pipe 12, two or more pressure sensors may be used around the circumference of the pipe 12 at each of the axial locations. The signals from the pressure sensors around the circumference at a given axial location may be averaged to provide a cross-sectional (or circumference) averaged unsteady acoustic pressure measurement. Other numbers of acoustic pressure sensors and annular spacing may be used. Averaging multiple annular pressure sensors reduces noises from disturbances and pipe vibrations and other sources of noise not related to the one-dimensional acoustic pressure waves in the pipe 12, thereby creating a spatial array of pressure sensors to help characterize the one-dimensional sound field within the pipe 12.

The pressure sensors 18-21 of FIG. 1 described herein may be any type of pressure sensor, capable of measuring the unsteady (or ac or dynamic) pressures within a pipe 14, such as piezoelectric, optical, capacitive, resistive (e.g., Wheatstone bridge), accelerometers (or geophones), velocity measuring devices, displacement measuring devices, etc. If optical pressure sensors are used, the sensors 18-21 may be Bragg grating based pressure sensors, such as that described in U.S. patent application Ser. No. 08/925,598, entitled "High Sensitivity Fiber Optic Pressure Sensor For Use In Harsh Environments", filed Sep. 8, 1997, now U.S. Pat. No. 6,016,702, and in U.S. patent application Ser. No. 10/224,821, entitled "Non-Intrusive Fiber Optic Pressure Sensor for Measuring Unsteady Pressures within a Pipe", which are incorporated herein by reference. In an embodiment of the present invention that utilizes fiber optics as the pressure sensors 14 they may be connected individually or may be multiplexed along one or more optical fibers using wavelength division multiplexing (WDM), time division multiplexing (TDM), or any other optical multiplexing techniques.

In certain embodiments of the present invention, a piezoelectronic pressure transducer may be used as one or more of the pressure sensors 15-18 and it may measure the unsteady (or dynamic or ac) pressure variations inside the tube 14 by measuring the pressure levels inside of the tube. In an embodiment of the present invention, the sensors 14 comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors incorporate a built-in MOSFET microelectronic amplifier to convert the high-impedance charge output into a low-impedance voltage signal. The sensor is powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply. A data acquisition system of the present invention may incorporate constant-current power for directly powering integrated circuit piezoelectric sensors.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

It is also within the scope of the present invention that any strain sensing technique may be used to measure the variations in strain in the pipe, such as highly sensitive piezoelectric, electronic or electric, strain gages and piezo-resistive strain gages attached to the pipe 12. Other strain gages include resistive foil type gages having a race track configuration similar to that disclosed U.S. patent application Ser. No. 09/344,094, filed Jun. 25, 1999, now U.S. Pat. No. 6,354,147, which is incorporated herein by reference. The invention also contemplates strain gages being disposed about a predetermined portion of the circumference of pipe 12. The axial placement of and separation distance $\Delta X_1$, $\Delta X_2$ between the strain sensors are determined as described herein above.

It is also within the scope of the present invention that any other strain sensing technique may be used to measure the variations in strain in the tube, such as highly sensitive piezoelectric, electronic or electric, strain gages attached to or embedded in the tube 14.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring at least one parameter of a process flow flowing within a pipe, the apparatus comprising:
   at least two strain sensors disposable about an outer circumference of the pipe at different axial locations along the pipe, each of the strain sensors providing a respective strain signal indicative of a pressure disturbance within the pipe at a corresponding axial position, each of the strain sensors comprising:
      a strap, and
      a piezoelectric film material having a pair of conductors disposed on opposing surfaces thereof whereby the piezoelectric film material is attached to the strap which transfers the strain of the pipe to the piezoelectric film material; and
   a signal processor, responsive to said strain signals, for determining the slope of an acoustic ridge in the k-w plane to provide a signal indicative of at least one parameter of the process flow flowing within the pipe.

2. The apparatus of claim 1, wherein the process flow is one of a single phase fluid and a multi-phase mixture.

3. The apparatus of claim 1, wherein the piezoelectric film material is attached to the outer surface of the strap.

4. The apparatus of claim 1, wherein the strap is a metallic material.

5. The apparatus of claim 1, wherein at least one of the strain sensors include an attachment device for securing the ends of the strap of the strain sensor to clamp the strain sensor onto the pipe.

6. The apparatus of claim 1, wherein the ends of at least one of the strain sensors are removably attached together to enable the removable and reattachment to a pipe.

7. The apparatus of claim 1, wherein the ends of at least one of the strain sensors are permanently attached together.

8. The apparatus of claim 1, wherein the piezoelectric film material includes at least one of polyvinylchlorine fluoride (PDVF), polymer film and flexible PZT.

9. The apparatus of claim 1, wherein each of the pair of conductors is a coating of silver ink.

10. The apparatus of claim 1, wherein the piezoelectric film material extends around a substantial portion of the circumference of the pipe.

11. The apparatus of claim 1, wherein the piezoelectric film material has a thickness greater than 8 mm.

12. The apparatus of claim 1, wherein the piezoelectric film material has a thickness between 8 mm and 120 mm.

13. The apparatus of claim 1, further includes an electrical insulator between the piezoelectric film material and the strap.

14. The apparatus of claim 1, wherein the strain signals are indication of acoustic pressures propagating within the pipe.

15. The apparatus of claim 1, wherein the parameter of the fluid is one of steam quality or "wetness", vapor/mass ratio, liquid/solid ratio, volumetric flow rate, mass flow rate, size of suspended particles, density, gas volume fraction, and enthalpy of the flow.

16. The apparatus of claim 1, wherein the strain signals are indication of vortical disturbances within the fluid flow.

17. The apparatus of claim 16, wherein the parameter of the fluid is one of velocity of the process flow and the volumetric flow of the process fluid.

18. The apparatus of claim 1, wherein the signal processor determines the slope of a convective ridge in the k-w plane to determine the velocity of the fluid flowing in the pipe.

19. The apparatus of claim 1, wherein the signal processor determines the volumetric flow rate of the fluid flowing in the pipe in response to the velocity of the fluid.

20. The apparatus of claim 1 wherein each sensor measures an acoustic pressure and provides a signal indicative of an acoustic noise within the pipe.

21. The apparatus of claim 1, wherein the swain sensors include pressure sensors.

22. The apparatus of claim 1, wherein the piezoelectric film material is attached to the inner surface of the strap.

23. A strain sensor comprising:
a strap disposable about an outer circumference of a pipe, and
a piezoelectric film material having a pair of conductors disposed on opposing surfaces thereof, the piezoelectric film material having a thickness greater than 8 mm, wherein the piezoelectric film material is attached to the strap which transfers the strain of the pipe to the piezoelectric film material to thereby provide a strain measurement indicative of a pressure disturbance within the pipe.

24. The sensor of claim 23, wherein the piezoelectric film material is attached to the outer surface of the strap.

25. The sensor of claim 23, wherein the strap is a metallic material.

26. The sensor of claim 23, wherein the strain sensor includes an attachment device for securing the ends of the strap of the strain sensor to clamp the strain sensor onto a pipe.

27. The sensor of claim 23, wherein the ends of the strain sensor are removably attached together to enable the removable and reattachment to a pipe.

28. The sensor of claim 23, wherein the ends of the strain sensor are permanently attached together.

29. The sensor of claim 23, wherein the piezoelectric film material includes at least one of polyvinylchlorine fluoride (PDVF), polymer film and flexible PZT.

30. The sensor of claim 23, wherein each of the conductors is a coating of silver ink.

31. The sensor of claim 23, wherein the piezoelectric film material extends around a substantial portion of the circumference of a pipe.

32. The sensor of claim 23, wherein the piezoelectric film material has a thickness between 8 mm and 120 mm.

33. The sensor of claim 23, further includes an electrical insulator between the piezoelectric film material and the strap.

34. The sensor of claim 23, wherein the piezoelectric film material is attached to the inner surface of the strap.

35. An apparatus for measuring at least one parameter of a process flow flowing within a pipe, the apparatus comprising:
at least three strain sensors disposable about an outer circumference of the pipe at different axial locations along the pipe, each of the strain sensors providing a respective strain signal indicative of a pressure disturbance within the pipe at a corresponding axial position, each of the strain sensors comprising:
a strap, and
a piezoelectric film material having a pair of conductors disposed on opposing surfaces thereof whereby the piezoelectric film material is attached to the strap which transfers the strain of the pipe to the piezoelectric film material; and
a signal processor, responsive to said strain signals, which provides a signal indicative of at least one parameter of the process flow flowing within the pipe.

36. The apparatus of claim 35, wherein the process flow is one of a single phase fluid and a multi-phase mixture.

37. The apparatus of claim 35, wherein at least one of the strain sensors include an attachment device for securing the ends of the strap of the strain sensor to clamp the strain sensor onto the pipe.

38. The apparatus of claim 35, wherein the ends of at least one of the strain sensors are removably attached together to enable the removable and reattachment to a pipe.

39. The apparatus of claim 35, wherein the piezoelectric film material includes at least one of polyvinylchlorine fluoride (PDVF), polymer film and flexible PZT.

40. The apparatus of claim 35, wherein each of the pair of conductors is a coating of silver ink.

41. The apparatus of claim 35, further includes an electrical insulator between the piezoelectric film material and the strap.

42. The apparatus of claim 35, wherein the strain signals are indication of acoustic pressures propagating within the pipe.

43. The apparatus of claim 35, wherein the parameter of the fluid is one of steam quality or "wetness", vapor/mass ratio, liquid/solid ratio, volumetric flow rate, mass flow rate, size of suspended particles, density, gas volume fraction, and enthalpy of the flow.

44. The apparatus of claim 35, wherein the signal processor determines the slope of an acoustic ridge in the k-w plane to determine a parameter of the process flow flowing in the pipe.

45. The apparatus of claim 35, wherein the strain signals are indication of vortical disturbances within the fluid flow.

46. The apparatus of claim 45, wherein the parameter of the fluid is one of velocity of the process flow and the volumetric flow of the process fluid.

47. The apparatus of claim 35, wherein the signal processor determines the slope of a convective ridge in the k-w plane to determine the velocity of the fluid flowing in the pipe.

48. The apparatus of claim 35, wherein the signal processor generates a flow velocity signal indicative of the velocity of the fluid flowing within the pipe by cross-correlating the strain signals.

49. The apparatus of claim 35, wherein each sensor measures an acoustic pressure and provides a signal indicative of an acoustic noise within the pipe.

* * * * *